United States Patent
Zhang et al.

(10) Patent No.: US 9,942,856 B2
(45) Date of Patent: Apr. 10, 2018

(54) CELL CONFIGURATION METHOD, DEVICE AND SYSTEM

(71) Applicant: HUAWEI TECHNOLOGIES CO., LTD., Shenzhen (CN)

(72) Inventors: Peng Zhang, Shanghai (CN); Zongjie Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 324 days.

(21) Appl. No.: 14/735,835

(22) Filed: Jun. 10, 2015

(65) Prior Publication Data

US 2015/0282094 A1   Oct. 1, 2015

Related U.S. Application Data

(63) Continuation of application No. PCT/CN2012/086322, filed on Dec. 11, 2012.

(51) Int. Cl.
*H04W 4/00* (2009.01)
*H04W 52/14* (2009.01)
(Continued)

(52) U.S. Cl.
CPC ......... *H04W 52/146* (2013.01); *H04W 36/04* (2013.01); *H04W 52/12* (2013.01); *H04W 52/244* (2013.01); *H04W 52/40* (2013.01)

(58) Field of Classification Search
None
See application file for complete search history.

(56) References Cited

U.S. PATENT DOCUMENTS

2003/0114179 A1   6/2003   Smolyar et al.
2004/0142692 A1*  7/2004   Schwarz ............... H04W 52/12
                                                             455/442
(Continued)

FOREIGN PATENT DOCUMENTS

CN   101610571 A   12/2009
CN   102474828 A    5/2012
(Continued)

OTHER PUBLICATIONS

*3rd Generation Partnership Project; Technical Specification Group Radio Access Network; UTRAN Iub interface Node B Application Part (NBAP) signalling* (Release 11) (3GPP TS 25.433 V11.2.0 (Sep. 2012)), 3$^{rd}$ Generation Partnership Project (3GPP™), Sep. 2012, pp. 1-1293 in English.

(Continued)

*Primary Examiner* — Zewdu A Beyen
(74) *Attorney, Agent, or Firm* — Staas & Halsey LLP

(57) ABSTRACT

Embodiments of the present invention provide a cell configuration method, a device, and a system. The method includes: configuring reference uplink signal-to-interference ratios, UL SIRs/a reference uplink signal-to-interference ratio, UL SIR, for the UE in the first cell and/or the second cell, so that a first reference UL SIR for the UE in the first cell is different from a second reference UL SIR for the UE in the second cell. When the UE is located in a soft handover area and a serving cell is the first cell, power control performed by the first cell on the UE is enhanced so that uplink transmit power of the UE can meet a requirement of the first cell.

17 Claims, 9 Drawing Sheets

(51) Int. Cl.
  *H04W 36/04*  (2009.01)
  *H04W 52/12*  (2009.01)
  H04W 52/24  (2009.01)
  H04W 52/40  (2009.01)

(56) References Cited

U.S. PATENT DOCUMENTS

2007/0281728 A1* 12/2007 Charriere ............ H04B 17/0085
                     455/522
2009/0318182 A1 12/2009 Nagato et al.
2012/0213092 A1  8/2012 Sun et al.
2014/0228069 A1  8/2014 Grokop et al.

FOREIGN PATENT DOCUMENTS

EP     2 219 393 A1  8/2010
EP     2 456 262 A1  5/2012
WO  WO 2008/100954 A2  8/2008

OTHER PUBLICATIONS

International Search Report dated Sep. 19, 2013 for International Patent Application No. PCT/CN2012/086322.
Extended European Search Report dated Oct. 29, 2015 for European Patent Application No. 12890081.8.
International Search Report dated Sep. 19, 2013 in corresponding international application PCT/CN2012/086322.

* cited by examiner

CELL CONFIGURATION METHOD, DEVICE AND SYSTEM

CROSS-REFERENCE TO RELATED APPLICATIONS

This application is a continuation of International Application No. PCT/CN2012/086322 filed on Dec. 11, 2012, which is hereby incorporated by reference in its entirety.

TECHNICAL FIELD

The present invention relates to the field of communications technologies, and in particular, to a cell configuration method a device, and a system.

BACKGROUND

A HetNet (heterogeneous network) is a network that is jointly formed by a macro cell with a large coverage area and a micro cell (Small Cell) with a small coverage area. A coverage area of a cell is determined by downlink transmit power of the cell.

In the HetNet, uplink transmit power of a UE (user equipment) depends only on the UE itself; however, downlink transmit power of the macro cell is greater than downlink transmit power of the micro cell. Therefore, an uplink power balance point is different from a downlink power balance point. Referring to FIG. 1, FIG. 1 shows a schematic structural diagram of a macro cell and a micro cell in HetNet networking. A point A in the figure is an uplink power balance point between the macro cell and the micro cell. In this case, a path loss of an uplink signal sent by the UE to the macro cell is the same as that to the micro cell. A point B in the figure, closer to the micro cell, is a downlink power balance point between the macro cell and the micro cell. In this case, signal strength of a downlink signal received by the UE from the macro cell is the same as that from the micro cell. Generally, the point B is also a serving cell handover point. On the right side of the point B, a serving cell of the UE is the micro cell, and on the left side of the point B, the serving cell of the UE is the macro cell. Around the point B is an SHO (Soft Handover) area CD. After the UE enters the SHO area CD, both the macro cell and the micro cell are generally added by an RNC to an active set of the UE. In this case, the UE receives power control instructions from both the macro cell and the micro cell. An existing power control method includes:

responding, by the UE, with a power decreasing operation if the UE receives a "power decreasing" instruction from any cell in the active set; and responding, by the UE, with a power increasing operation only if the UE receives "power increasing" instructions from all cells in the active set.

In a process of implementing the present invention, the prior art has the following disadvantages: when the UE is located in a CB area, the macro cell is the serving cell of the UE; however, when the macro cell sends a "power increasing" instruction to the UE, the micro cell usually sends a "power decreasing" instruction to the UE; as a result, power control performed by the macro cell on the UE cannot meet an actual uplink transmit power requirement of the macro cell for the UE, and therefore, the UE cannot normally feed back, to the macro cell, a signal indicating whether data is correctly received, thereby affecting normal data transmission.

SUMMARY

In view of this, embodiments of the present invention provide a cell configuration method, a power control method, a device and a system, so as to resolve a problem that power control performed by a macro cell on a UE cannot meet an actual requirement when the UE is located in a soft handover area and a serving cell is the macro cell. The technical solutions are as follows:

According to a first aspect, a cell configuration method is provided, which is used for power control when an active set of a user equipment UE includes both a first cell and a second cell, where the method includes:

sending a predetermined instruction for the UE to the second cell, so that after receiving the predetermined instruction, the second cell sends only a power increasing instruction to the UE.

In a first possible implementation manner of the first aspect, before the sending a predetermined instruction for the UE to the second cell, the method further includes:

detecting whether the UE meets a first predetermined condition, where the first predetermined condition includes the following: the UE is located in a soft handover area and a serving cell of the UE is the first cell; and sending the predetermined instruction for the UE to the second cell if it is detected that the UE meets the first predetermined condition.

With reference to the first possible implementation manner of the first aspect, in a second possible implementation manner, after the sending a predetermined instruction for the UE to the second cell, the method further includes:

detecting whether the UE meets a second predetermined condition, where the second predetermined condition includes the following: the UE leaves the soft handover area or the serving cell of the UE is the second cell; and sending a restoration instruction for the UE to the second cell if it is detected that the UE meets the second predetermined condition, so that after receiving the restoration instruction, the second cell sends a power increasing instruction or a power decreasing instruction to the UE according to a normal mode.

With reference to the second possible implementation manner of the first aspect, in a third possible implementation manner, the restoration instruction is uplink signal-to-interference ratio UL SIR signaling including a normal value; or the restoration instruction is newly added information element signaling.

With reference to the first aspect or the first, second or third possible implementation manner of the first aspect, in a fourth possible implementation manner, the predetermined instruction is UL SIR signaling including a specified value or the predetermined instruction is newly added information element signaling; and when the predetermined instruction is the UL SIR signaling including a specified value, the specified value is a value out of a value range of the UL SIR signaling, or the specified value is a specified value within a value range of the UL SIR signaling, or the specified value is a predetermined character.

According to a second aspect, a power control method is provided, which is used for power control when an active set of a user equipment UE includes both a first cell and a second cell, where the method includes:

receiving a predetermined instruction sent by a radio network controller for the UE; and sending only a power increasing instruction to the UE after the predetermined instruction is received.

In a first possible implementation manner of the second aspect, after the receiving a predetermined instruction sent by a radio network controller for the UE, the method further includes:

receiving a restoration instruction sent by the radio network controller for the UE; and sending a power increasing instruction or a power decreasing instruction to the UE according to a normal mode after the restoration instruction is received.

With reference to the first possible implementation manner of the second aspect, in a second possible implementation manner, the restoration instruction is uplink signal-to-interference ratio UL SIR signaling including a normal value; or the restoration instruction is newly added information element signaling.

With reference to the second aspect or the first possible implementation manner or the second possible implementation manner of the second aspect, in a third possible implementation manner, the predetermined instruction is UL SIR signaling including a specified value or the predetermined instruction is newly added information element signaling; and when the predetermined instruction is the UL SIR signaling including a specified value, the specified value is a value out of a value range of the UL SIR signaling, or the specified value is a specified value within a value range of the UL SIR signaling, or the specified value is a predetermined character.

According to a third aspect, a cell configuration method is provided, which is used for power control when an active set of a user equipment UE includes both a first cell and a second cell, where the method includes:

configuring reference uplink signal-to-interference ratios UL SIRs/a reference uplink signal-to-interference ratio UL SIR for the UE in the first cell and/or the second cell, so that a first reference UL SIR for the UE in the first cell is different from a second reference UL SIR for the UE in the second cell.

In a first possible implementation manner of the third aspect, the configuring reference UL SIRs/a reference UL SIR for the UE in the first cell and/or the second cell, so that a first reference UL SIR for the UE in the first cell is different from a second reference UL SIR for the UE in the second cell specifically includes:

sending UL SIR signaling to the first cell, where the UL SIR signaling includes a first reference UL SIR configured this time, and the first reference UL SIR configured this time is different from a current second reference UL SIR; or sending UL SIR signaling to the second cell, where the UL SIR signaling includes a second reference UL SIR configured this time, and the second reference UL SIR configured this time is different from a current first reference UL SIR; or sending UL SIR signaling to both the first cell and the second cell, where the UL SIR signaling sent to the first cell includes a first reference UL SIR configured this time; the UL SIR signaling sent to the second cell includes a second reference UL SIR configured this time; and the first reference UL SIR configured this time is different from the second reference UL SIR configured this time.

With reference to the first possible implementation manner of the third aspect, in a second possible implementation manner, the UL SIR signaling is UL SIR signaling whose value range has been extended.

In a third possible implementation manner of the third aspect, the configuring reference UL SIRs/a reference UL SIR for the UE in the first cell and/or the second cell, so that a first reference UL SIR for the UE in the first cell is different from a second reference UL SIR for the UE in the second cell specifically includes:

sending a setting instruction to the first cell, where the setting instruction includes a first SIR adjustment amount, so that a first reference UL SIR that is configured this time and obtained by the first cell is: a current first reference UL SIR+the first SIR adjustment amount; or sending a setting instruction to the second cell, where the setting instruction includes a second SIR adjustment amount, so that a second reference UL SIR that is configured this time and obtained by the second cell is: a current second reference UL SIR+the second SIR adjustment amount; or sending setting instructions to both the first cell and the second cell, where the setting instruction sent to the first cell includes a first SIR adjustment amount, so that a first reference UL SIR that is configured this time and obtained by the first cell is: a current first reference UL SIR+/−the first SIR adjustment amount; the setting instruction sent to the second cell includes a second SIR adjustment amount, so that a second reference UL SIR that is configured this time and obtained by the second cell is: a current second reference UL SIR+/−the second SIR adjustment amount; and the first reference UL SIR configured this time is different from the second reference UL SIR configured this time.

With reference to the third possible implementation manner of the third aspect, in a fourth possible implementation manner, the setting instruction is newly added information element signaling.

With reference to the first, second, third, or fourth possible implementation manner of the third aspect, in a fifth possible implementation manner, before the configuring reference UL SIRs/a reference UL SIR for the UE in the first cell and/or the second cell, the method further includes:

determining, according to a difference between an uplink path loss of the UE relative to the first cell and an uplink path loss of the UE relative to the second cell, a difference obtained when the first reference UL SIR is different from the second reference UL SIR; and determining, according to the difference, a configuration parameter required when the reference UL SIRs/the reference UL SIR for the UE are/is configured in the first cell and/or the second cell, where the configuration parameter includes at least one of the following: the first reference UL SIR configured this time, the second reference UL SIR configured this time, the first SIR adjustment amount, and the second SIR adjustment amount.

With reference to the fifth possible implementation manner of the third aspect, in a sixth possible implementation manner, the determining, according to a difference between an uplink path loss of the UE relative to the first cell and an uplink path loss of the UE relative to the second cell, a difference obtained when the first reference UL SIR is different from the second reference UL SIR includes:

determining that an absolute value of the difference obtained when the first reference UL SIR is different from the second reference UL SIR is equal to an absolute value of the difference between the uplink path loss of the UE relative to the first cell and the uplink path loss of the UE relative to the second cell.

With reference to the third aspect or the first, second, third, fourth, fifth, or sixth possible implementation manner of the third aspect, in a seventh possible implementation manner, before the configuring reference UL SIRs/a reference UL SIR for the UE in the first cell and/or the second cell, the method further includes:

detecting whether the UE meets a first predetermined condition, where the first predetermined condition includes the following: the UE is located in a soft handover area and a serving cell of the UE is the first cell; and configuring the reference UL SIRs/the reference UL SIR for the UE in the first cell and/or the second cell if it is detected that the UE meets the first predetermined condition.

With reference to the seventh possible implementation manner of the third aspect, in an eighth possible implementation manner, after the configuring reference UL SIRs/a reference UL SIR for the UE in the first cell and/or the second cell, the method further includes:

detecting whether the UE meets a second predetermined condition, where the second predetermined condition includes the following: the UE leaves the soft handover area or the serving cell of the UE is the second cell; and configuring the reference UL SIRs/the reference UL SIR for the UE in the first cell and/or the second cell if it is detected that the UE meets the second predetermined condition, so that the first reference UL SIR for the UE in the first cell is equal to the second reference UL SIR for the UE in the second cell.

With reference to the third aspect or the first, second, third, fourth, fifth, sixth, seventh, or eighth possible implementation manner of the third aspect, in a ninth possible implementation manner, the method further includes:

sending UL SIR signaling having a specified value to the second cell, so that after receiving the UL SIR signaling having a specified value, the second cell sends only a power increasing instruction to the UE, where the specified value is a value out of a value range of the UL SIR signaling, or the specified value is a specified value within a value range of the UL SIR signaling, or the specified value is a predetermined character.

With reference to the third or fourth possible implementation manner of the third aspect, in a tenth possible implementation manner, the method further includes:

sending particular setting signaling to the second cell, where the particular setting signaling includes a second SIR adjustment amount having a specified value, so that after receiving the second SIR adjustment amount having a specified value, the micro cell sends only a power increasing instruction to the UE, where the specified value is a predetermined number or a predetermined character.

According to a fourth aspect, a power control method is provided, which is used for power control when an active set of a user equipment UE includes both a first cell and a second cell, where the method includes:

receiving a reference uplink signal-to-interference ratio UL SIR configured by a radio network controller for the UE, so that a first reference UL SIR for the UE in the first cell is different from a second reference UL SIR for the UE in the second cell; and performing power control on the UE according to the reference UL SIR.

In a first possible implementation manner of the fourth aspect, the receiving a reference UL SIR configured by a radio network controller for the UE includes:

receiving UL SIR signaling sent by the radio network controller, where the UL SIR signaling includes a first reference UL SIR configured this time; and updating a current first reference UL SIR with the first reference UL SIR configured this time, where the first reference UL SIR configured this time is different from a current second reference UL SIR; or receiving UL SIR signaling sent by the radio network controller, where the UL SIR signaling includes a second reference UL SIR configured this time; and updating a current second reference UL SIR with the second reference UL SIR configured this time, where the second reference UL SIR configured this time is different from a current first reference UL SIR.

With reference to the first possible implementation manner of the fourth aspect, in a second possible implementation manner, the UL SIR signaling is UL SIR signaling whose value range has been extended.

In a third possible implementation manner of the fourth aspect, the configuring reference UL SIRs/a reference UL SIR for the UE in the first cell and/or the second cell, so that a first reference UL SIR for the UE in the first cell is different from a second reference UL SIR for the UE in the second cell includes:

receiving a particular setting instruction sent by the radio network controller, where the particular setting instruction includes a first SIR adjustment amount; and adjusting the first reference UL SIR to be: a current first reference UL SIR+the first SIR adjustment amount; or receiving a setting instruction sent by the radio network controller, where the setting instruction includes a second SIR adjustment amount; and adjusting the second reference UL SIR to be: a current second reference UL SIR+the second SIR adjustment amount.

With reference to the third possible implementation manner of the fourth aspect, in a fourth possible implementation manner, the setting instruction is newly added information element signaling.

With reference to the fourth aspect or the first, second, third or fourth possible implementation manner of the fourth aspect, in a fifth possible implementation manner, the method further includes:

receiving UL SIR signaling that has a specified value and is sent by the radio network controller; and sending only a power increasing instruction to the UE after the UL SIR signaling having a specified value is received, where the specified value is a value out of a value range of the UL SIR signaling, or the specified value is a specified value within a value range of the UL SIR signaling, or the specified value is a predetermined character.

With reference to the third or fourth possible implementation manner of the fourth aspect, in a fifth possible implementation manner, the method further includes:

receiving particular setting signaling sent by the radio network controller, where the particular setting signaling includes a second SIR adjustment amount having a specified value; and sending only a power increasing instruction to the UE after the second SIR adjustment amount having a specified value is received, where the specified value is a predetermined number or a predetermined character.

According to a fifth aspect, a radio network controller is provided, which is used for power control when an active set of a user equipment UE includes both a first cell and a second cell, where the radio network controller includes:

a predetermined sending module, configured to send a predetermined instruction for the UE to the second cell, so that after receiving the predetermined instruction, the second cell sends only a power increasing instruction to the UE.

In a first possible implementation manner of the fifth aspect, the radio network controller further includes:

a condition detection module, where the condition detection module is configured to detect whether the UE meets a first predetermined condition, where the first predetermined condition includes the following: the UE is located in a soft handover area and a serving cell of the UE is the first cell; and the predetermined sending module is configured to send the predetermined instruction for the UE to the second cell if the condition detection module detects that the UE meets the first predetermined condition.

With reference to the first possible implementation manner of the fifth aspect, in a second possible implementation manner, the condition detection module is further configured to detect whether the UE meets a second predetermined condition, where the second predetermined condition includes the following: the UE leaves the soft handover area or the serving cell of the UE is the second cell; and the predetermined sending module is further configured to send a restoration instruction for the UE to the second cell if the condition detection module detects that the UE meets the second predetermined condition, so that after receiving the restoration instruction, the second cell sends a power increasing instruction or a power decreasing instruction to the UE according to a normal mode.

With reference to the second possible implementation manner of the fifth aspect, in a third possible implementation manner, the restoration instruction sent by the predetermined sending module is UL SIR signaling including a normal value; or the restoration instruction sent by the predetermined sending module is newly added information element signaling.

With reference to the fifth aspect or the first, second, or third possible implementation manner of the fifth aspect, in a fourth possible implementation manner, the predetermined instruction sent by the predetermined sending module is uplink signal-to-interference ratio UL SIR signaling including a specified value or the predetermined instruction is newly added information element signaling; and when the predetermined instruction is the uplink signal-to-interference ratio UL SIR signaling including a specified value, the specified value is a value out of a value range of the UL SIR signaling, or the specified value is a specified value within a value range of the UL SIR signaling, or the specified value is a predetermined character.

According to a sixth aspect, a base station is provided, which is used for power control when an active set of a user equipment UE includes both a first cell and a second cell, where the base station includes:

a predetermined receiving module, configured to receive a predetermined instruction sent by a radio network controller for the UE; and an instruction sending module, configured to send only a power increasing instruction to the UE after the predetermined receiving module receives the predetermined instruction.

In a first possible implementation manner of the sixth aspect, the predetermined receiving module is further configured to receive a restoration instruction sent by the radio network controller for the UE; and the instruction sending module is further configured to send a power increasing instruction or a power decreasing instruction to the UE according to a normal mode after the restoration instruction is received.

With reference to the first possible implementation manner of the sixth aspect, in a second possible implementation manner, the restoration instruction received by the predetermined receiving module is UL SIR signaling including a normal value; or the restoration instruction received by the predetermined receiving module is newly added information element signaling.

With reference to the sixth aspect or the first or second possible implementation manner of the sixth aspect, in a third possible implementation manner, the predetermined instruction received by the predetermined receiving module is UL SIR signaling including a specified value, where the specified value is a value out of a value range of the UL SIR signaling, or the specified value is a specified value within a value range of the UL SIR signaling, or the specified value is a predetermined character, or the predetermined instruction received by the predetermined receiving module is newly added information element signaling.

According to a seventh aspect, a radio network controller is provided, which is used for power control when an active set of a user equipment UE includes both a first cell and a second cell, where the radio network controller includes:

a reference configuration module, configured to configure reference uplink signal-to-interference ratios UL SIRs/a reference uplink signal-to-interference ratio UL SIR for the UE in the first cell and/or the second cell, so that a first reference UL SIR for the UE in the first cell is different from a second reference UL SIR for the UE in the second cell.

In a first possible implementation manner of the seventh aspect, the reference configuration module is specifically configured to send UL SIR signaling to the first cell, where the UL SIR signaling includes a first reference UL SIR configured this time, and the first reference UL SIR configured this time is different from a current second reference UL SIR; or the reference configuration module is specifically configured to send UL SIR signaling to the second cell, where the UL SIR signaling includes a second reference UL SIR configured this time, and the second reference UL SIR configured this time is different from a current first reference UL SIR; or the reference configuration module is specifically configured to send UL SIR signaling to both the first cell and the second cell, where the UL SIR signaling sent to the first cell includes a first reference UL SIR configured this time; the UL SIR signaling sent to the second cell includes a second reference UL SIR configured this time; and the first reference UL SIR configured this time is different from the second reference UL SIR configured this time.

With reference to the first possible implementation manner of the seventh aspect, in a second possible implementation manner, the UL SIR signaling sent by the reference configuration module is UL SIR signaling whose value range has been extended.

In a third possible implementation manner of the seventh aspect, the reference configuration module is specifically configured to send a setting instruction to the first cell, where the setting instruction includes a first SIR adjustment amount, so that a first reference UL SIR that is configured this time and obtained by the first cell is: a current first reference UL SIR+the first SIR adjustment amount; or the reference configuration module is specifically configured to send a setting instruction to the second cell, where the setting instruction includes a second SIR adjustment amount, so that a second reference UL SIR that is configured this time and obtained by the second cell is: a current second reference UL SIR+the second SIR adjustment amount; or the reference configuration module is specifically configured to send setting instructions to both the first cell and the second cell, where the setting instruction sent to the first cell includes a first SIR adjustment amount, so that a first reference UL SIR that is configured this time and obtained by the first cell is: a current first reference UL SIR+/−the first SIR adjustment amount; the setting instruction sent to the second cell includes a second SIR adjustment amount, so that a second reference UL SIR that is configured this time and obtained by the second cell is: a current second reference UL SIR+/−the second SIR adjustment amount; and the first reference UL SIR configured this time is different from the second reference UL SIR configured this time.

With reference to the third possible implementation manner of the seventh aspect, in a fourth possible implementation manner, the setting instruction sent by the reference configuration module is newly added information element signaling.

With reference to the seventh aspect or the first, second, third or fourth possible implementation manner of the seventh aspect, in a fifth possible implementation manner, the radio network controller further includes: a difference determining module and a parameter determining module, where the difference determining module is configured to determine, according to a difference between an uplink path loss of the UE relative to the first cell and an uplink path loss of the UE relative to the second cell, a difference obtained when the first reference UL SIR is different from the second reference UL SIR; and the parameter determining module is configured to determine, according to the difference determined by the difference determining module, a configuration parameter required when the reference configuration module configures the reference UL SIRs/the reference UL SIR for the UE in the first cell and/or the second cell, where the configuration parameter includes at least one of the following: the first reference UL SIR configured this time, the second reference UL SIR configured this time, the first SIR adjustment amount, and the second SIR adjustment amount.

With reference to the fifth possible implementation manner of the seventh aspect, in a sixth possible implementation manner, the difference determining module is specifically configured to determine that an absolute value of the difference obtained when the first reference UL SIR is different from the second reference UL SIR is equal to an absolute value of the difference between the uplink path loss of the UE relative to the first cell and the uplink path loss of the UE relative to the second cell.

With reference to the seventh aspect or the first, second, third, fourth, fifth, or sixth possible implementation manner of the seventh aspect, in a seventh possible implementation manner, the radio network controller further includes:

a condition detection module, where the condition detection module is configured to detect whether the UE meets a first predetermined condition, where the first predetermined condition includes the following: the UE is located in a soft handover area and a serving cell of the UE is the first cell; and the reference configuration module is configured to configure the reference UL SIRs/the reference UL SIR for the UE in the first cell and/or the second cell if the condition detection module detects that the UE meets the first predetermined condition.

With reference to the seventh possible implementation manner of the seventh aspect, in an eighth possible implementation manner, the condition detection module is further configured to detect whether the UE meets a second predetermined condition, where the second predetermined condition includes the following: the UE leaves the soft handover area or the serving cell of the UE is the second cell; and the reference configuration module is further configured to configure the reference UL SIRs/the reference UL SIR for the UE in the first cell and/or the second cell if the condition detection module detects that the UE meets the second predetermined condition, so that the first reference UL SIR for the UE in the first cell is equal to the second reference UL SIR for the UE in the second cell.

With reference to the seventh aspect or the first, second, third, fourth, fifth, or sixth possible implementation manner of the seventh aspect, in a seventh possible implementation manner, the radio network controller further includes:

a specified-value sending module, where the specified-value sending module is configured to send UL SIR signaling having a specified value to the second cell, so that after receiving the UL SIR signaling having a specified value, the second cell sends only a power increasing instruction to the UE, where the specified value is a value out of a value range of the UL SIR signaling, or the specified value is a specified value within a value range of the UL SIR signaling, or the specified value is a predetermined character.

With reference to the third or fourth possible implementation manner of the seventh aspect, in a fifth possible implementation manner, the radio network controller further includes:

a particular-signaling sending module, where the particular-signaling sending module is configured to send particular setting signaling to the second cell, where the particular setting signaling includes a second SIR adjustment amount having a specified value, so that after receiving the second SIR adjustment amount having a specified value, the micro cell sends only a power increasing instruction to the UE, where the specified value is a predetermined number or a predetermined character.

According to an eighth aspect, a base station is provided, which is used for power control when an active set of a user equipment UE includes both a first cell and a second cell, where the base station includes:

a reference receiving module, configured to receive a reference uplink signal-to-interference ratio UL SIR configured by a radio network controller for the UE, so that a first reference UL SIR for the UE in the first cell is different from a second reference UL SIR for the UE in the second cell; and a power control module, configured to perform power control on the UE according to the reference UL SIR received by the reference receiving module.

In a first possible implementation manner of the eighth aspect, the reference receiving module specifically includes:

a signaling receiving unit and a reference updating unit, where the signaling receiving unit is configured to receive UL SIR signaling sent by the radio network controller, where the UL SIR signaling includes a first reference UL SIR configured this time; and the reference updating unit is configured to update a current first reference UL SIR with the first reference UL SIR that is configured this time and received by the signaling receiving unit, where the first reference UL SIR configured this time is different from a current second reference UL SIR; or the signaling receiving unit is configured to receive UL SIR signaling sent by the radio network controller, where the UL SIR signaling includes a second reference UL SIR configured this time; and the reference updating unit is configured to update a current second reference UL SIR with the second reference UL SIR that is configured this time and received by the signaling receiving unit, where the second reference UL SIR configured this time is different from a current first reference UL SIR.

With reference to the first possible implementation manner of the eighth aspect, in a second possible implementation manner, the UL SIR signaling received by the signaling receiving unit is UL SIR signaling whose value range has been extended.

In a third possible implementation manner of the eighth aspect, the reference receiving module specifically includes:

a setting receiving unit and a reference adjusting unit, where the setting receiving unit is configured to receive a setting instruction sent by the radio network controller, where the setting instruction includes a first SIR adjustment amount; and the reference adjusting unit is configured to adjust the first reference UL SIR to be: a current first reference UL SIR+the first SIR adjustment amount; or the setting receiving unit is configured to receive a setting instruction sent by the radio network controller, where the setting instruction includes a second SIR adjustment amount; and the reference adjusting unit is configured to adjust the second reference UL SIR to be: a current second reference UL SIR+the second SIR adjustment amount.

With reference to the third possible implementation manner of the eighth aspect, in a fourth possible implementation manner, the setting instruction received by the setting receiving unit is newly added information element signaling.

With reference to the eighth aspect or the first, second, third or fourth possible implementation manner of the eighth aspect, in a fifth possible implementation manner, the base station further includes:

a specified receiving module and an instruction sending module, where the specified receiving module is configured to receive UL SIR signaling that has a specified value and is sent by the radio network controller; and the instruction sending module is configured to send only a power increasing instruction to the UE after the specified receiving module receives the UL SIR signaling having a specified value, where the specified value is a value out of a value range of the UL SIR signaling, or the specified value is a specified value within a value range of the UL SIR signaling, or the specified value is a predetermined character.

With reference to the third or fourth possible implementation manner of the eighth aspect, in a fifth possible implementation manner, the base station further includes:

a particular receiving module and an instruction sending module, where the particular receiving module is configured to receive particular setting signaling sent by the radio network controller, where the particular setting signaling includes a second SIR adjustment amount having a specified value; and the instruction sending module is configured to send only a power increasing instruction to the UE after the particular receiving module receives the second SIR adjustment amount having a specified value, where the specified value is a predetermined number or a predetermined character.

According to a ninth aspect, a radio network controller is provided, which is used for power control when an active set of a user equipment UE includes both a first cell and a second cell, where the radio network controller includes: a processor and a transmitter, where the processor is configured to control the transmitter to send a predetermined instruction for the UE to the second cell, so that after receiving the predetermined instruction, the second cell sends only a power increasing instruction to the UE.

In a first possible implementation manner of the ninth aspect, the processor is further configured to detect whether the UE meets a first predetermined condition, where the first predetermined condition includes the following: the UE is located in a soft handover area and a serving cell of the UE is the first cell; and the transmitter is specifically configured to send the predetermined instruction for the UE to the second cell if the processor detects that the UE meets the first predetermined condition.

With reference to the first possible implementation manner of the ninth aspect, in a second possible implementation manner, the processor is further configured to detect whether the UE meets a second predetermined condition, where the second predetermined condition includes the following: the UE leaves the soft handover area or the serving cell of the UE is the second cell; and the transmitter is further configured to send a restoration instruction for the UE to the second cell if the processor detects that the UE meets the second predetermined condition, so that after receiving the restoration instruction, the second cell sends a power increasing instruction or a power decreasing instruction to the UE according to a normal mode.

With reference to the second possible implementation manner of the ninth aspect, in a third possible implementation manner, the restoration instruction sent by the transmitter is UL SIR signaling including a normal value; or the restoration instruction sent by the transmitter is newly added information element signaling.

With reference to the second or third possible implementation manner of the ninth aspect, in a fourth possible implementation manner, the predetermined instruction sent by the transmitter is uplink signal-to-interference ratio UL SIR signaling including a specified value or the predetermined instruction is newly added information element signaling; and when the predetermined instruction is the UL SIR signaling including a specified value, the specified value is a value out of a value range of the UL SIR signaling, or the specified value is a specified value within a value range of the UL SIR signaling, or the specified value is a predetermined character.

According to a tenth aspect, a base station is provided, which is used for power control when an active set of a user equipment UE includes both a first cell and a second cell, where the base station includes: a receiver, a processor and a transmitter, where the receiver is configured to receive a predetermined instruction sent by a radio network controller for the UE; and the processor is configured to control the transmitter to send only a power increasing instruction to the UE after the receiver receives the predetermined instruction.

In a first possible implementation manner of the tenth aspect, the receiver is further configured to receive a restoration instruction sent by the radio network controller for the UE; and the processor is configured to control the transmitter to send a power increasing instruction or a power decreasing instruction to the UE according to a normal mode after the receiver receives the restoration instruction.

With reference to the first possible implementation manner of the tenth aspect, in a second possible implementation manner, the restoration instruction received by the receiver is UL SIR signaling including a normal value; or the restoration instruction received by the receiver is newly added information element signaling.

With reference to the tenth aspect or the first or second possible implementation manner of the tenth aspect, in a third possible implementation manner, the predetermined instruction received by the receiver is UL SIR signaling including a specified value or the predetermined instruction is newly added information element signaling; and when the predetermined instruction is the UL SIR signaling including a specified value, the specified value is a value out of a value range of the UL SIR signaling, or the specified value is a specified value within a value range of the UL SIR signaling, or the specified value is a predetermined character.

According to an eleventh aspect, a radio network controller is provided, which is used for power control when an active set of a user equipment UE includes both a first cell and a second cell, where the radio network controller includes: a processor and a transmitter, where the processor is configured to control the transmitter to configure reference uplink signal-to-interference ratios UL SIRs/a reference uplink signal-to-interference ratio UL SIR for the UE in the first cell and/or the second cell, so that a first reference UL SIR for the UE in the first cell is different from a second reference UL SIR for the UE in the second cell.

In a first possible implementation manner of the eleventh aspect, the processor is specifically configured to control the transmitter to send UL SIR signaling to the first cell, where the UL SIR signaling includes a first reference UL SIR configured this time, and the first reference UL SIR configured this time is different from a current second reference UL SIR; or the processor is specifically configured to control the transmitter to send UL SIR signaling to the second cell, where the UL SIR signaling includes a second reference UL SIR configured this time, and the second reference UL SIR configured this time is different from a current first reference UL SIR; or the processor is specifically configured to control the transmitter to send UL SIR signaling to both the first cell and the second cell, where the UL SIR signaling sent to the first cell includes a first reference UL SIR configured this time; the UL SIR signaling sent to the second cell includes a second reference UL SIR configured this time; and the first reference UL SIR configured this time is different from the second reference UL SIR configured this time.

With reference to the first possible implementation manner of the eleventh aspect, in a second possible implementation manner, the UL SIR signaling sent by the transmitter is UL SIR signaling whose value range has been extended.

In a third possible implementation manner of the eleventh aspect, the processor is specifically configured to control the transmitter to send a setting instruction to the first cell, where the setting instruction includes a first SIR adjustment amount, so that a first reference UL SIR that is configured this time and obtained by the first cell is: a current first reference UL SIR+the first SIR adjustment amount; or the processor is specifically configured to control the transmitter to send a setting instruction to the second cell, where the setting instruction includes a second SIR adjustment amount, so that a second reference UL SIR that is configured this time and obtained by the second cell is: a current second reference UL SIR+the second SIR adjustment amount; or the processor is specifically configured to control the transmitter to send setting instructions to both the first cell and the second cell, where the setting instruction sent to the first cell includes a first SIR adjustment amount, so that a first reference UL SIR that is configured this time and obtained by the first cell is: a current first reference UL SIR+/−the first SIR adjustment amount; the setting instruction sent to the second cell includes a second SIR adjustment amount, so that a second reference UL SIR that is configured this time and obtained by the second cell is: a current second reference UL SIR+/−the second SIR adjustment amount; and the first reference UL SIR configured this time is different from the second reference UL SIR configured this time.

With reference to the third possible implementation manner of the eleventh aspect, in a fourth possible implementation manner, the setting instruction sent by the transmitter is newly added information element signaling.

With reference to the eleventh aspect or the first, second, third, or fourth possible implementation manner of the second aspect, in a fifth possible implementation manner, the processor is further configured to determine, according to a difference between an uplink path loss of the UE relative to the first cell and an uplink path loss of the UE relative to the second cell, a difference obtained when the first reference UL SIR is different from the second reference UL SIR; and the processor is further configured to determine, according to the difference, a configuration parameter required when the reference UL SIRs/the reference UL SIR for the UE are/is configured in the first cell and/or the second cell, where the configuration parameter includes at least one of the following: the first reference UL SIR configured this time, the second reference UL SIR configured this time, the first SIR adjustment amount, and the second SIR adjustment amount.

With reference to the fifth possible implementation manner of the eleventh aspect, in a sixth possible implementation manner, the processor is specifically configured to determine that an absolute value of the difference obtained when the first reference UL SIR is different from the second reference UL SIR is equal to an absolute value of the difference between the uplink path loss of the UE relative to the first cell and the uplink path loss of the UE relative to the second cell.

With reference to the eleventh aspect or the first, second, third, fourth, fifth, or sixth possible implementation manner of the eleventh aspect, in a seventh possible implementation manner, the processor is further configured to detect whether the UE meets a first predetermined condition, where the first predetermined condition includes the following: the UE is located in a soft handover area and a serving cell of the UE is the first cell; and the transmitter is configured to configure the reference UL SIRs/the reference UL SIR for the UE in the first cell and/or the second cell if the processor detects that the UE meets the first predetermined condition.

With reference to the seventh possible implementation manner of the eleventh aspect, in an eighth possible implementation manner, the processor is further configured to detect whether the UE meets a second predetermined condition, where the second predetermined condition includes the following: the UE leaves the soft handover area or the serving cell of the UE is the second cell; and the transmitter is further configured to configure the reference UL SIRs/the reference UL SIR for the UE in the first cell and/or the second cell if the processor detects that the UE meets the second predetermined condition, so that the first reference UL SIR for the UE in the first cell is equal to the second reference UL SIR for the UE in the second cell.

With reference to the eleventh aspect or the first, second, third, fourth, fifth, sixth, seventh, or eighth possible implementation manner of the eleventh aspect, in a ninth possible implementation manner, the processor is further configured to control the transmitter to send UL SIR signaling having a specified value to the second cell, so that after receiving the UL SIR signaling having a specified value, the second cell sends only a power increasing instruction to the UE, where the specified value is a value out of a value range of the UL SIR signaling, or the specified value is a specified value within a value range of the UL SIR signaling, or the specified value is a predetermined character.

With reference to the third or fourth possible implementation manner of the eleventh aspect, in a ninth possible implementation manner, the processor is further configured to control the transmitter to send particular setting signaling to the second cell, where the particular setting signaling includes a second SIR adjustment amount having a specified value, so that after receiving the second SIR adjustment amount having a specified value, the micro cell sends only a power increasing instruction to the UE, where the specified value is a predetermined number or a predetermined character.

According to a twelfth aspect, a base station is provided, which is used for power control when an active set of a UE includes both a first cell and a second cell, where the base station includes: a receiver and a processor, where the receiver is configured to receive a reference UL SIR configured by a radio network controller for the UE, so that a first reference UL SIR for the UE in the first cell is different from a second reference UL SIR for the UE in the second cell; and the processor is configured to perform power control on the UE according to the reference UL SIR received by the receiver.

In a first possible implementation manner of the twelfth aspect, the receiver is specifically configured to receive UL SIR signaling sent by the radio network controller, where the UL SIR signaling includes a first reference UL SIR configured this time; and the processor is specifically configured to update a current first reference UL SIR with the first reference UL SIR that is configured this time and received by the receiver, where the first reference UL SIR configured this time is different from a current second reference UL SIR; or the receiver is specifically configured to receive UL SIR signaling sent by the radio network controller, where the UL SIR signaling includes a second reference UL SIR configured this time; and the processor is specifically configured to update a current second reference UL SIR with the second reference UL SIR that is configured this time and received by the receiver, where the second reference UL SIR configured this time is different from a current first reference UL SIR.

With reference to the first possible implementation manner of the twelfth aspect, in a second possible implementation manner, the UL SIR signaling received by the receiver is UL SIR signaling whose value range has been extended.

In a third possible implementation manner of the twelfth aspect, the receiver is specifically configured to receive a setting instruction sent by the radio network controller, where the setting instruction includes a first SIR adjustment amount; and the processor is specifically configured to adjust the first reference UL SIR to be: a current first reference UL SIR+the first SIR adjustment amount received by the receiver; or the receiver is specifically configured to receive a setting instruction sent by the radio network controller, where the setting instruction includes a second SIR adjustment amount; and the processor is specifically configured to adjust the second reference UL SIR to be: a current second reference UL SIR+the second SIR adjustment amount received by the receiver.

With reference to the third possible implementation manner of the twelfth aspect, in a fourth possible implementation manner, the setting instruction received by the receiver is newly added information element signaling.

With reference to the twelfth aspect or the first, second, third or fourth possible implementation manner of the twelfth aspect, in a fifth possible implementation manner, the base station further includes a transmitter; where:

the receiver is configured to receive UL SIR signaling that has a specified value and is sent by the radio network controller; and the processor is configured to control the transmitter to send only a power increasing instruction to the UE after the receiver receives the UL SIR signaling having a specified value, where the specified value is a value out of a value range of the UL SIR signaling, or the specified value is a specified value within a value range of the UL SIR signaling, or the specified value is a predetermined character.

With reference to the third or fourth possible implementation manner of the twelfth aspect, in a sixth possible implementation manner, the base station further includes a transmitter; where:

the receiver is configured to receive particular setting signaling sent by the radio network controller, where the particular setting signaling includes a second SIR adjustment amount having a specified value; and the processor is configured to control the transmitter to send only a power increasing instruction to the UE after the receiver receives the second SIR adjustment amount having a specified value, where the specified value is a predetermined number or a predetermined character.

According to a thirteenth aspect, a communications system is provided, including the radio network controller according to any one of the fifth aspect, all the possible implementation manners of the fifth aspect, the ninth aspect, and all the possible implementation manners of the ninth aspect, and the base station according to any one of the sixth aspect, all the possible implementation manners of the sixth aspect, the tenth aspect, and all the possible implementation manners of the tenth aspect.

According to a fourteenth aspect, a communications system is provided, including the radio network controller according to any one of the seventh aspect, all the possible implementation manners of the seventh aspect, the eleventh aspect, and all the possible implementation manners of the eleventh aspect, and the base station according to any one of the eighth aspect, all the possible implementation manners of the eighth aspect, the twelfth aspect, and all the possible implementation manners of the twelfth aspect.

Beneficial effects of the technical solutions provided in the embodiments of the present invention are as follows:

A predetermined instruction is sent to enable a second cell to send only a power increasing instruction to a UE, or a reference UL SIR value in a second cell is configured to be different from a reference UL SIR value in a first cell, so that the second cell is triggered, only in the case of a higher threshold, to send a power increasing instruction to a UE, thereby resolving a problem that power control performed by the first cell on the UE cannot meet an actual requirement when the UE is located in a soft handover area and a serving cell is the first cell, and achieving an effect that power control performed by the first cell on the UE is enhanced so that uplink transmit power of the UE can meet a requirement of the first cell.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

The applicant finds in a research process that, an RNC (Radio Network Controller, radio network controller) configures a same reference UL SIR (uplink signal-to-interference ratio) value for each UE in a macro cell and a micro cell, and both the macro cell and the micro cell perform power control on the UE by using the same reference UL SIR value corresponding to the UE. When an actual UL SIR value of the UE is greater than the reference UL SIR value, a cell sends a "power decreasing" instruction to the UE; when the actual UL SIR value of the UE is less than the reference UL SIR value, the cell sends a "power increasing" instruction to the UE. Because a path loss of an uplink signal sent by the UE to the micro cell is less than that to the macro cell, it is more possible that the micro cell sends the "power decreasing" instruction to the UE. If a current serving cell of the UE is the macro cell, for example, the UE is located in a CB area, after transmit power of the UE is decreased by the micro cell, it is very likely that a power requirement of the macro cell when the UE sends the uplink signal cannot be met. In this case, even if the macro cell sends the "power increasing" instruction to the UE, the UE does not respond with a power increasing operation (because the micro cell sends the "power decreasing" instruction). As a result, power control performed by the macro cell on the UE cannot meet an actual requirement. Specifically, in a process of data transmission HARQ (hybrid automatic repeat request), after the macro cell sends data to the UE by using a downlink signal, the UE needs to notify, by using the uplink signal, the macro cell of related feedback information indicating whether related data is correctly received. If uplink transmit power of the UE is too small, the macro cell cannot receive the feedback information, thereby severely affecting a normal data transmission process of the macro cell. For example, after sending a data block to the UE, the macro cell cannot receive ACK (acknowledgment) information that is fed back by the UE by using the uplink signal and that indicates that the data block has been correctly received, causing the macro cell to retransmit the data block to the UE multiple times.

Therefore, the embodiments of the present invention provide two different methods to resolve the foregoing problem. For detailed description of the first method, reference may be first made to the following embodiments.

Figure 2:
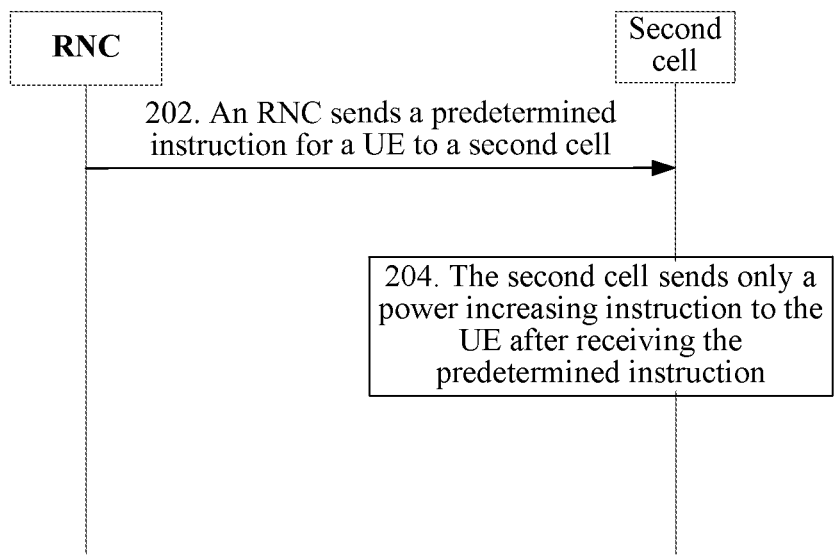
FIG. 2 is a method flowchart of a power control method according to an embodiment of the present invention.

Referring to FIG. 2, FIG. 2 shows a method flowchart of a power control method according to an embodiment of the present invention. The power control method is mainly used for power control when an active set of a UE includes both a first cell and a second cell. This embodiment is described mainly by using an example in which the first cell is a macro cell and the second cell is a micro cell. The power control method includes:

Step 202: An RNC sends a predetermined instruction for a UE to the second cell.

When the active set of the UE includes both the first cell and the second cell, the UE receives power control instructions from both the first cell and the second cell. In order to make power control performed by the first cell achieve a dominant position, the RNC may send the predetermined instruction for the UE to the second cell.

Step 204: The second cell sends only a power increasing instruction to the UE after receiving the predetermined instruction.

The second cell receives the predetermined instruction sent by the RNC for the UE.

After receiving the predetermined instruction, the second cell sends only the power increasing instruction to the UE, and cannot send a power decreasing instruction to the UE. In this case, if the first cell sends the power increasing instruction to the UE, the UE responds with a power increasing operation; if the first cell sends the power decreasing instruction to the UE, the UE responds with a power decreasing operation. Apparently, in this case, the power control performed by the first cell achieves a dominant position, and uplink transmit power of the UE is ensured.

The power increasing instruction may be specifically a TPC (transmit power control) UP instruction; the power decreasing instruction may be specifically a TPC DOWN instruction.

In conclusion, according to the power control method provided in this embodiment, a predetermined instruction is sent to enable a second cell to send only a power increasing instruction to a UE, thereby resolving a problem that power control performed by a first cell on the UE cannot meet an actual requirement when the UE is located in a soft handover area and a serving cell is the first cell, and achieving an effect that power control performed by the first cell on the UE is enhanced so that uplink transmit power of the UE can meet a requirement of the first cell.

It should be additionally noted that, the foregoing step 202 may be implemented independently as a cell configuration method; and the foregoing step 204 may also be implemented independently as a power control method. In addition, a person skilled in the art may easily figure out an embodiment in which the first cell is a micro cell or the second cell is a macro cell, and details are not described again.

Figure 3:
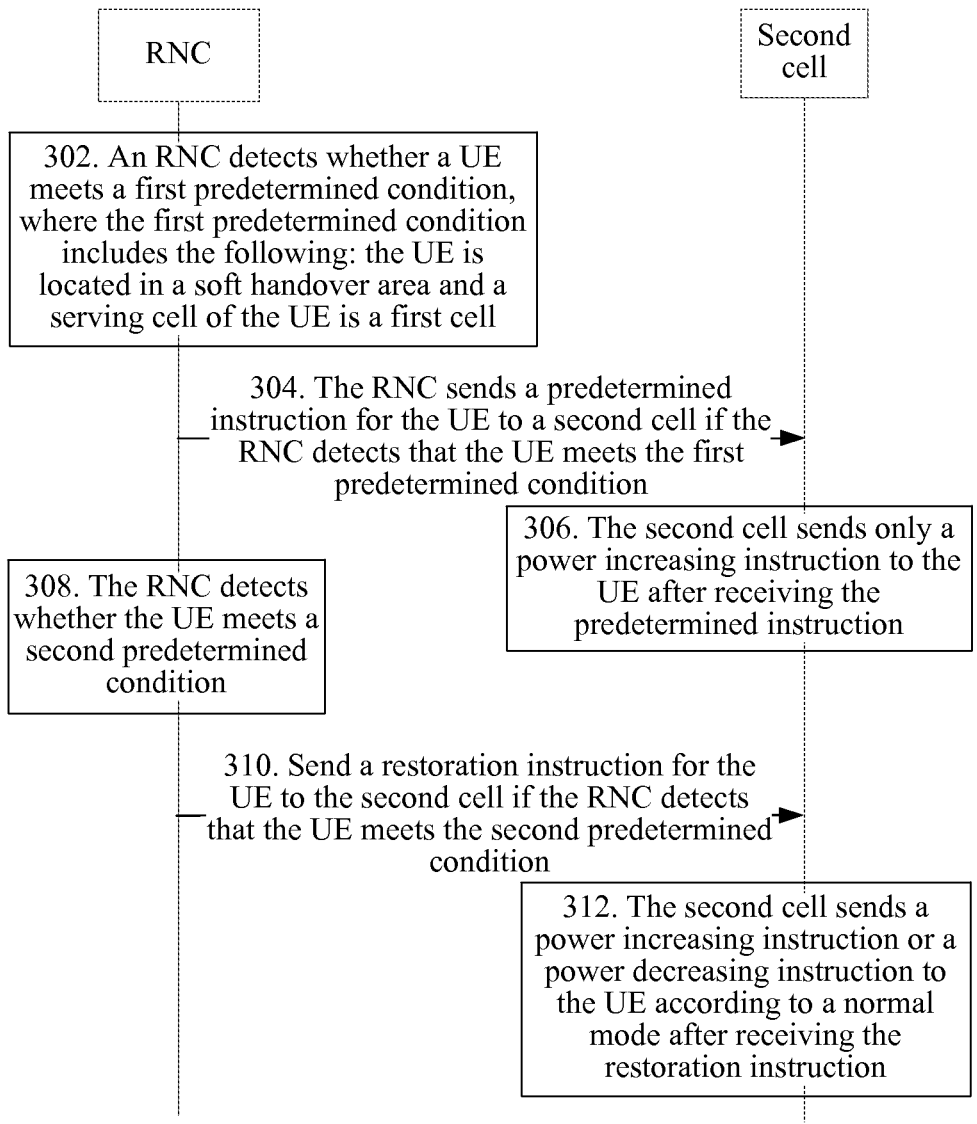
FIG. 3 is a method flowchart of a power control method according to another embodiment of the present invention.

Referring to FIG. 3, FIG. 3 shows a method flowchart of a power control method according to another embodiment of the present invention. The power control method is mainly used for power control when an active set of a UE includes both a first cell and a second cell. This embodiment is described mainly by using an example in which the first cell is a macro cell and the second cell is a micro cell. The power control method includes:

Step 302: An RNC detects whether the UE meets a first predetermined condition, where the first predetermined condition includes the following: the UE is located in a soft handover area and a serving cell of the UE is the first cell.

Figure 1:
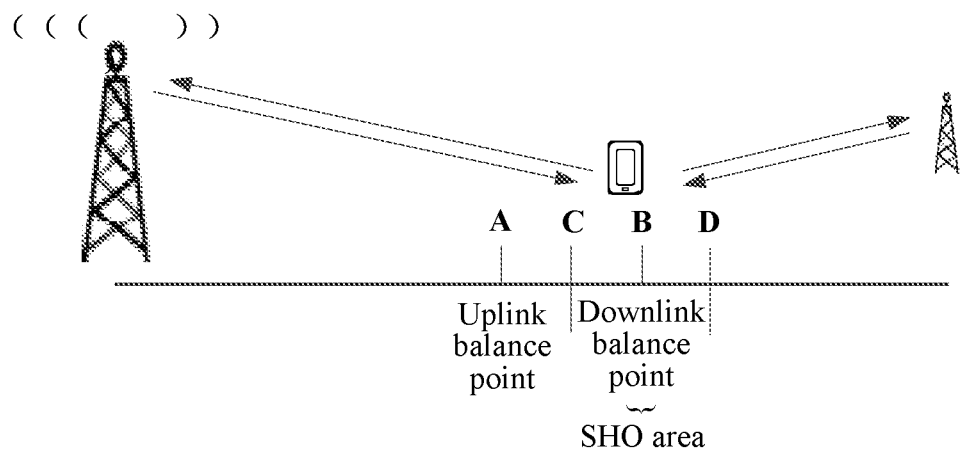
FIG. 1 is a schematic structural diagram of a macro cell and a micro cell in HetNet networking.

The RNC may enable, only when the UE meets the first predetermined condition, a second cell to enter a "special mode" of sending only a power increasing instruction to the UE. The first predetermined condition may include the following: the UE is located in the soft handover area and the serving cell of the UE is the first cell, which is similar to a scenario in which the UE is located in the CB area in FIG. 1. Certainly, the first predetermined condition may also further include another condition. For example, the first predetermined condition may be that the UE is located in the soft handover area, and the serving cell of the UE is the first cell, and a difference obtained by subtracting downlink transmit power of the second cell from downlink transmit power of the first cell is greater than a predetermined threshold. This embodiment is described by using only an example in which the predetermined condition includes the following: the UE is located in the soft handover area and the serving cell of the UE is the first cell.

The RNC may perform, according to internally pre-stored information and information reported by the UE in real time, a process of determining whether the UE meets the predetermined condition.

Step 304: The RNC sends a predetermined instruction for the UE to the second cell if the RNC detects that the UE meets the first predetermined condition.

The RNC sends the predetermined instruction for the UE to the second cell if the RNC detects that the UE meets the predetermined condition.

The predetermined instruction may be UL SIR signaling including a specified value. The UL SIR signaling is existing IE (information element) signaling, used to configure a reference UL SIR value in a cell. A defined value range is (−82, 173). The RNC and the second cell may agree on a specified value in advance, and when a value of the UL SIR signaling is the specified value, the UL SIR signaling is the predetermined instruction.

The specified value may be a value out of the value range of the UL SIR signaling, such as 200, and in this case, the value range of the existing UL SIR signaling needs to be extended. Certainly, the specified value may also be a specified value within the value range of the UL SIR signaling, such as 170. Furthermore, the specified value may also be a predetermined character instead of a number, as long as the RNC and the second cell reach an agreement in advance.

In another implementation manner, the predetermined instruction may also be implemented by using newly added information element signaling.

Step 306: The second cell sends only a power increasing instruction to the UE after receiving the predetermined instruction.

The second cell receives the predetermined instruction sent by the RNC for the UE.

After receiving the predetermined instruction, the second cell sends only the power increasing instruction to the UE, and cannot send a power decreasing instruction to the UE. In this case, if the first cell sends the power increasing instruction to the UE, the UE responds with a power increasing operation; if the first cell sends the power decreasing instruction to the UE, the UE responds with a power decreasing operation. Apparently, in this case, the power control performed by the first cell achieves a dominant position, and uplink transmit power of the UE is ensured.

The power increasing instruction may be specifically a TPC (transmit power control) UP instruction; the power decreasing instruction may be specifically a TPC DOWN instruction.

Step 308: The RNC detects whether the UE meets a second predetermined condition.

It is easy to figure out that, the RNC may further enable, when the UE meets the second predetermined condition, the micro cell to exit the "special mode" of sending only a power increasing instruction to the UE. The second predetermined condition includes the following: the UE leaves the soft handover area; or the serving cell of the UE is the second cell; or the UE currently does not use a downlink data transmission service; or the like. Therefore, after step 306, the RNC may further continue to detect whether the UE meets the second predetermined condition.

Step 310: Send a restoration instruction for the UE to the second cell if the RNC detects that the UE meets the second predetermined condition.

The restoration instruction for the UE is sent to the second cell if the RNC detects that the UE meets the second predetermined condition.

The restoration instruction may be UL SIR signaling including a normal value, where the normal value refers to another value except the specified value within the value range of the UL SIR signaling. For example, when the specified value is 170, UL SIR signaling with a value of 160 is the restoration instruction.

In another implementation manner, the restoration instruction may also be implemented by using newly added information element signaling.

Step 312: The second cell sends a power increasing instruction or a power decreasing instruction to the UE according to a normal mode after receiving the restoration instruction.

The second cell receives the restoration instruction sent by the RNC for the UE.

The second cell sends a power increasing instruction or a power decreasing instruction to the UE according to a normal mode after receiving the restoration instruction. That is, the second cell may learn, by using the UL SIR signaling, a reference UL SIR value that is corresponding to the UE and configured by the RNC. When an actual UL SIR value of the UE is greater than the reference UL SIR value, the second cell sends the "power decreasing" instruction to the UE; when the actual UL SIR value of the UE is less than the reference UL SIR value, the second cell sends the "power increasing" instruction to the UE.

In conclusion, according to the power control method provided in this embodiment, a predetermined instruction is sent to enable a second cell to send only a power increasing instruction to a UE, thereby resolving a problem that power control performed by a first cell on the UE cannot meet an actual requirement when the UE is located in a soft handover area and a serving cell is the first cell, and achieving an effect that power control performed by the first cell on the UE is enhanced so that uplink transmit power of the UE can meet a requirement of the first cell. In addition, by determining whether the UE meets a first predetermined condition or a second predetermined condition and then selectively enabling the second cell to enter or exit a "special mode" of sending only a power increasing instruction to the UE, the power control method provided in this embodiment can be better used in an existing communications system.

It should be additionally noted that, the foregoing step 302, step 304, step 308, and step 310 may be implemented independently as a cell configuration method; the foregoing step 306 and step 312 may also be implemented independently as a power control method. In addition, a person skilled in the art may easily figure out an embodiment in which the first cell is a micro cell or the second cell is a macro cell, and details are not described again.

For detailed description of the second method provided in the embodiments of the present invention, reference may be made to the following embodiments.

Figure 4:
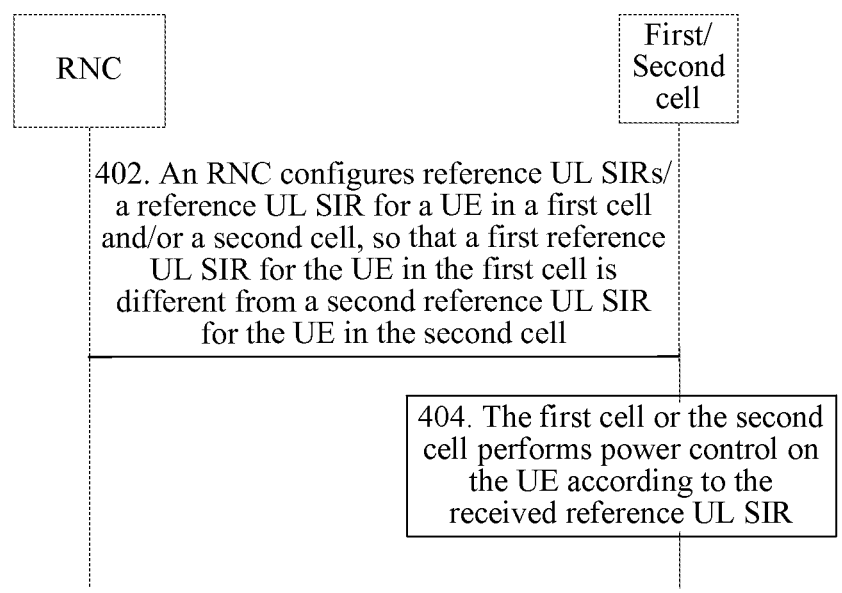
FIG. 4 is a method flowchart of a power control method according to an embodiment of the present invention.

Referring to FIG. 4, FIG. 4 shows a method flowchart of a power control method according to an embodiment of the present invention. The power control method is mainly used for power control when an active set of a UE includes both a first cell and a second cell. This embodiment is described mainly by using an example in which the first cell is a macro cell and the second cell is a micro cell. The power control method includes:

Step 402: An RNC configures reference UL SIRs/a reference UL SIR for a UE in the first cell and/or the second cell, so that a first reference UL SIR for the UE in the first cell is different from a second reference UL SIR for the UE in the second cell.

In an existing solution, for a same UE, the RNC configures a same reference UL SIR value in the first cell and the second cell. However, in this embodiment, the RNC configures different reference UL SIR values in the first cell and the second cell. Specifically, in order to eliminate power control difference caused by a difference between a path loss when an uplink signal sent by the UE to the first cell and that to the second cell, a second reference UL SIR configured by the RNC in the second cell may be greater than a first reference UL SIR configured in the first cell. This step may be implemented in the following manners:

The RNC may configure the first reference UL SIR only in the first cell, and the first reference UL SIR configured this time by the RNC in the first cell is different from a current second reference UL SIR of the second cell, where the current second reference UL SIR of the second cell may be a second reference UL SIR configured last time. For example, the RNC configures the first reference UL SIR only in the first cell and the first reference UL SIR configured this time is less than the second reference UL SIR configured last time.

The RNC may also configure the second reference UL SIR only in the second cell, and the second reference UL SIR configured this time by the RNC in the second cell is different from a current first reference UL SIR of the first cell, where the current first reference UL SIR of the first cell may be a first reference UL SIR configured last time. For example, the RNC configures the second reference UL SIR only in the second cell and the second reference UL SIR configured this time is greater than the first reference UL SIR configured last time.

The RNC may also configure reference UL SIRs in both the first cell and the second cell, and the first reference UL SIR configured this time by the RNC in the first cell is different from the second reference UL SIR configured this time in the second cell. For example, the RNC configures the reference UL SIRs in both the first cell and the second cell, and the first reference UL SIR configured this time is less than the second reference UL SIR configured this time.

Step 404: The first cell or the second cell performs power control on the UE according to the received reference UL SIR.

The first cell and/or the second cell receive/receives reference UL SIRs/a reference UL SIR that are/is for the UE and configured by the RNC, so that the first reference UL SIR for the UE in the first cell is different from the second reference UL SIR for the UE in the second cell.

Hereafter, the first cell and the second cell perform power control on the UE according to the reference UL SIR configured by the RNC. Specifically, when an actual UL SIR value of the UE is greater than the first reference UL SIR, the first cell sends a "power decreasing" instruction to the UE; when the actual UL SIR value of the UE is less than the first reference UL SIR, the first cell sends a "power increasing" instruction to the UE.

When the actual UL SIR value of the UE is greater than the second reference UL SIR, the second cell sends a "power decreasing" instruction to the UE; when the actual UL SIR value of the UE is less than the second reference UL SIR, the second cell sends a "power increasing" instruction to the UE.

In conclusion, according to the power control method provided in this embodiment, different reference UL SIR values are configured in a first cell and a second cell, so that the second cell is triggered, only in the case of a higher threshold, to send a power increasing instruction to a UE, thereby resolving a problem that power control performed by the first cell on the UE cannot meet an actual requirement when the UE is located in a soft handover area and a serving cell is the first cell, and achieving an effect that power control performed by the first cell on the UE is enhanced so that uplink transmit power of the UE can meet a requirement of the first cell. In addition, compared with the previous embodiment in which after entering the "special mode", the second cell can send only the power increasing instruction to the UE and cannot perform power decreasing control on the UE, in the method provided in this embodiment, the second cell can still perform normal power control on the UE, achieving a better power control effect.

It should be noted that, the foregoing step 402 may be implemented independently as a cell configuration method; the foregoing step 404 and step 406 may be implemented independently as a power control method.

Certainly, a person skilled in the art may easily figure out that: this embodiment is described mainly by using an example in which a second reference UL SIR configured by an RNC in the second cell is greater than a first reference UL SIR configured in the first cell so as to enhance power control performed by the first cell on the UE. However, in some scenarios, the second reference UL SIR configured by the RNC in the second cell may be less than the first reference UL SIR configured in the first cell, so as to weaken the power control performed by the first cell on the UE. For example, regardless of whether the first cell is a macro cell or a micro cell, and whether the second cell is a macro cell or a micro cell, in a scenario in which when the serving cell is the second cell, due to dual impacts of path loss and fading, the first cell can properly receive a signal from the UE but the second cell cannot properly receive a signal from the UE, the second reference UL SIR configured by the RNC in the second cell may be less than the first reference UL SIR configured in the first cell, so as to weaken the power control performed by the first cell on the UE.

Because the RNC configures different reference UL SIR values in the first cell and/or the second cell in two implementation manners, for more detailed description of the first implementation manner, reference is made to the following embodiment.

Figure 5:
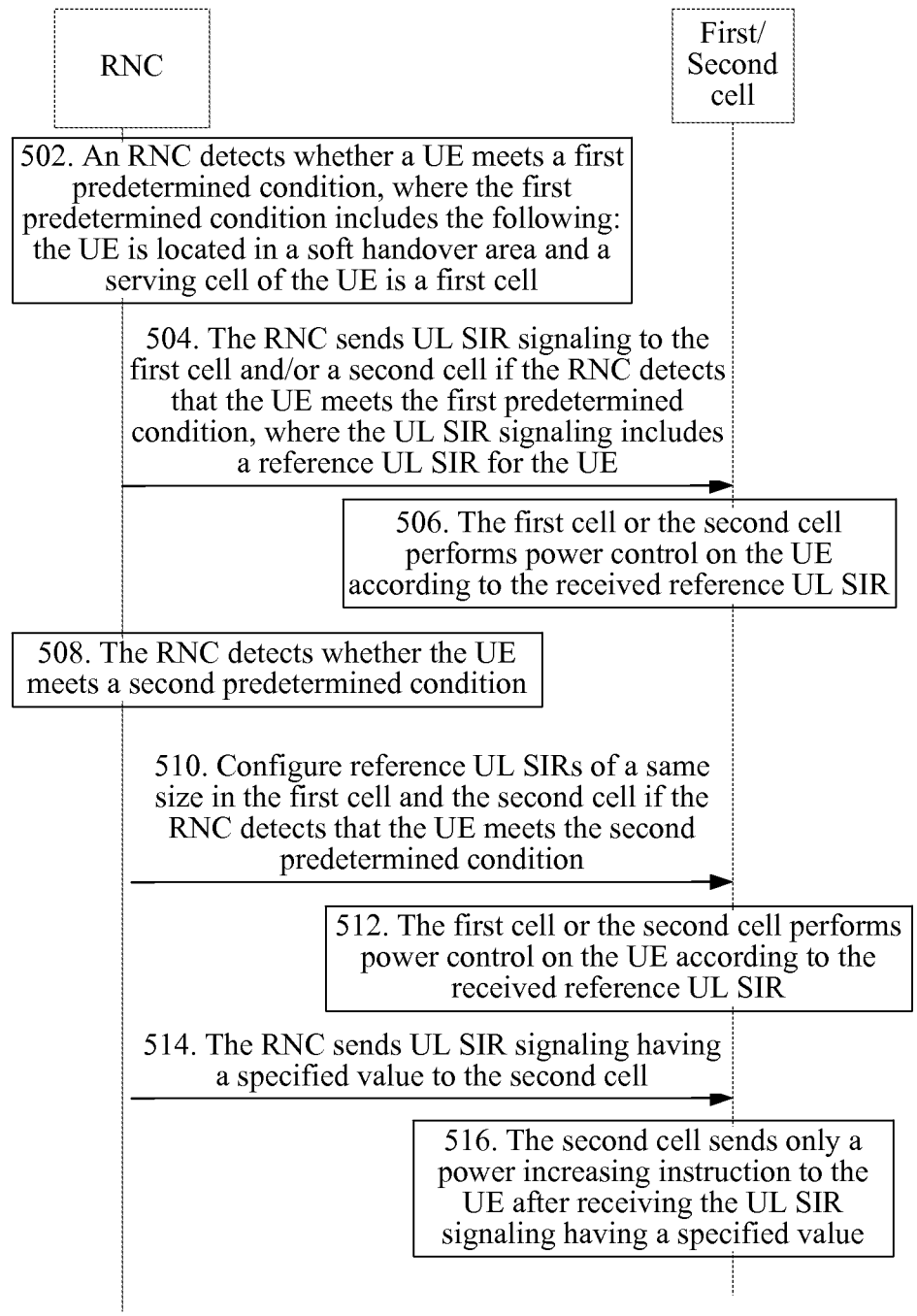
FIG. 5 is a method flowchart of a power control method according to another embodiment of the present invention.

Referring to FIG. 5, FIG. 5 shows a method flowchart of a power control method according to another embodiment of the present invention. The power control method is mainly used for power control when an active set of a UE includes both a first cell and a second cell. This embodiment is described mainly by using an example in which the first cell is a macro cell, and the second cell is a micro cell, and an RNC configures different reference UL SIR values in the first cell and the second cell by using existing UL SIR signaling. The power control method includes:

Step 502: An RNC detects whether the UE meets a first predetermined condition, where the first predetermined condition includes the following: the UE is located in a soft handover area and a serving cell of the UE is the first cell.

As optimization to the previous embodiment, the RNC may configure different reference UL SIR values in the first cell and the second cell only when the UE meets the first predetermined condition. The first predetermined condition may include the following: the UE is located in the soft handover area and the serving cell of the UE is the first cell, which is similar to a scenario in which the UE is located in the CB area in FIG. 1. Certainly, the first predetermined condition may also further include another condition. For example, the first predetermined condition may be that the UE is located in the soft handover area, and the serving cell of the UE is the first cell, and a difference obtained by subtracting downlink transmit power of the second cell from downlink transmit power of the first cell is greater than a predetermined threshold. This embodiment is described by using only an example in which the predetermined condition includes the following: the UE is located in the soft handover area and the serving cell of the UE is the first cell.

The RNC may perform, according to internally pre-stored information and information reported by the UE in real time, a process of determining whether the UE meets the first predetermined condition.

Step 504: The RNC sends UL SIR signaling to the first cell and/or the second cell if the RNC detects that the UE meets the first predetermined condition, where the UL SIR signaling includes a reference UL SIR for the UE.

When the RNC detects that the UE meets the first predetermined condition, the RNC may configure different reference UL SIR values in the first cell and the second cell. Specifically, the RNC may send UL SIR signaling to the first cell, where the UL SIR signaling includes a first reference UL SIR configured this time, and the first reference UL SIR configured this time is different from a current second reference UL SIR, where the current second reference UL SIR may be a second reference UL SIR configured this time or previous time. For example, the RNC has configured the second reference UL SIR in the second cell, and may configure the first reference UL SIR in the first cell this time, where the first reference UL SIR is less than the current second reference UL SIR. Or, the RNC may send UL SIR signaling to the second cell, where the UL SIR signaling includes a second reference UL SIR configured this time, and the second reference UL SIR configured this time is different from a current first reference UL SIR, where the current first reference UL SIR may be a first reference UL SIR configured this time or previous time. For example, the RNC has configured the first reference UL SIR in the first cell, and may configure the second reference UL SIR in the second cell this time, where the second reference UL SIR is greater than the current first reference UL SIR. Or, the RNC may send UL SIR signaling to both the first cell and the second cell, where the UL SIR signaling sent to the first cell includes a first reference UL SIR configured this time; the UL SIR signaling sent to the second cell includes a second reference UL SIR configured this time; and the first reference UL SIR configured this time is different from the second reference UL SIR configured this time. For example, the RNC configures reference UL SIRs for the UE in both the first cell and the second cell for the first time, and the first reference UL SIR configured this time is less than the second reference UL SIR configured this time.

It should be additionally noted that, before configuring different reference UL SIRs in the first cell and the second cell, the RNC may determine, according to a difference between an uplink path loss of the UE relative to the first cell and an uplink path loss of the UE relative to the second cell, a difference obtained when the first reference UL SIR is different from the second reference UL SIR. For example, the RNC may determine that an absolute value of the difference obtained when the first reference UL SIR is different from the second reference UL SIR is equal to an absolute value of the difference between the uplink path loss of the UE relative to the first cell and the uplink path loss of the UE relative to the second cell. Then, the RNC determines, according to the determined difference, a configuration parameter required when the reference UL SIRs/the reference UL SIR for the UE are/is configured in the first cell and/or the second cell, where the configuration parameter includes at least one of the first reference UL SIR configured this time and the second reference UL SIR configured this time. In another embodiment, the RNC may further determine a size of a difference between the first reference UL SIR and the second reference UL SIR when both the path loss and the fading are considered.

Because the RNC needs to configure a reference UL SIR value in one cell greater than that in another cell, a value range of the existing UL SIR signaling probably cannot meet usage. In this case, UL SIR signaling whose value range has been extended may be used, for example, UL SIR signaling with a value range of (−83, 210).

Step 506: The first cell or the second cell performs power control on the UE according to the received reference UL SIR.

The first cell and/or the second cell receive/receives reference UL SIRs/a reference UL SIR configured by the RNC for the UE. Specifically, if the RNC sends the UL SIR signaling to the first cell, the first cell receives the UL SIR signaling sent by the RNC, where the UL SIR signaling includes a first reference UL SIR configured this time; and the first cell updates a current first reference UL SIR with the first reference UL SIR configured this time, where the first reference UL SIR configured this time is different from a current second reference UL SIR.

If the RNC sends the UL SIR signaling to the second cell, the second cell receives the UL SIR signaling sent by the RNC, where the UL SIR signaling includes a second reference UL SIR configured this time; and the second cell updates a current second reference UL SIR with the second reference UL SIR configured this time, where the second reference UL SIR configured this time is different from a current first reference UL SIR.

Hereafter, the first cell and the second cell perform power control on the UE according to the reference UL SIR configured by the RNC. Specifically, when an actual UL SIR value of the UE is greater than the first reference UL SIR, the first cell sends a "power decreasing" instruction to the UE; when the actual UL SIR value of the UE is less than the first reference UL SIR, the first cell sends a "power increasing" instruction to the UE.

When the actual UL SIR value of the UE is greater than the second reference UL SIR, the second cell sends a "power decreasing" instruction to the UE; when the actual UL SIR value of the UE is less than the second reference UL SIR, the second cell sends a "power increasing" instruction to the UE.

Step 508: The RNC detects whether the UE meets a second predetermined condition.

It is easy to figure out that, the RNC may further reconfigure a same reference UL SIR value in the first cell and the second cell when the UE meets the second predetermined condition. The second predetermined condition includes the following: the UE leaves the soft handover area; or the serving cell of the UE is the second cell; or the UE currently does not use a service transmitted by downlink data; or the like. Therefore, after step 504, the RNC may further continue to detect whether the UE meets the second predetermined condition.

Step 510: Configure a same reference UL SIR value in the first cell and the second cell if the RNC detects that the UE meets the second predetermined condition.

The a same reference UL SIR value are configured in the first cell and the second cell if the RNC detects that the UE meets the second predetermined condition. This process may be easily figured out by associating step 504 and details are not described again.

Step 512: The first cell or the second cell performs power control on the UE according to the received reference UL SIR.

Hereafter, the first cell and the second cell may perform power control on the UE according to the same reference UL SIR value. Specific control details are the same as those in step 506, and details are not described again.

Step 514: The RNC sends UL SIR signaling having a specified value to the second cell.

This embodiment may further combine the method described in Embodiment 1, that is, the RNC sends UL SIR signaling having a specified value to the second cell, so as to enable the second cell to send only a power increasing instruction to the UE.

The specified value is a value out of a value range of the UL SIR signaling, or the specified value is a specified value within a value range of the UL SIR signaling, or the specified value is a predetermined character.

Step 516: The second cell sends only a power increasing instruction to the UE after receiving the UL SIR signaling having a specified value.

In conclusion, according to the power control method provided in this embodiment of the present invention, different reference UL SIR values are configured in a first cell and a second cell, so that the second cell is triggered, only in the case of a higher threshold, to send a power increasing instruction to a UE, thereby resolving a problem that power control performed by the first cell on the UE cannot meet an actual requirement when the UE is located in a soft handover area and a serving cell is the first cell, and achieving an effect that power control performed by the first cell on the UE is enhanced so that uplink transmit power of the UE can meet a requirement of the first cell. In addition, by determining whether the UE meets a first predetermined condition and a second predetermined condition and then selectively configuring a same reference UL SIR value or different reference UL SIR values in the first cell and the second cell, the power control method provided in this embodiment can be better used in an existing communications system.

It should be noted that, the foregoing step 502, step 504, step 508, step 510, and step 514 may be implemented independently as a cell configuration method; the foregoing step 506, step 512, and step 516 may be implemented independently as a power control method.

Because the RNC configures different reference UL SIR values in the first cell and/or the second cell in two implementation manners, for more detailed description of the second implementation manner, reference is made to the following embodiment.

Figure 6:
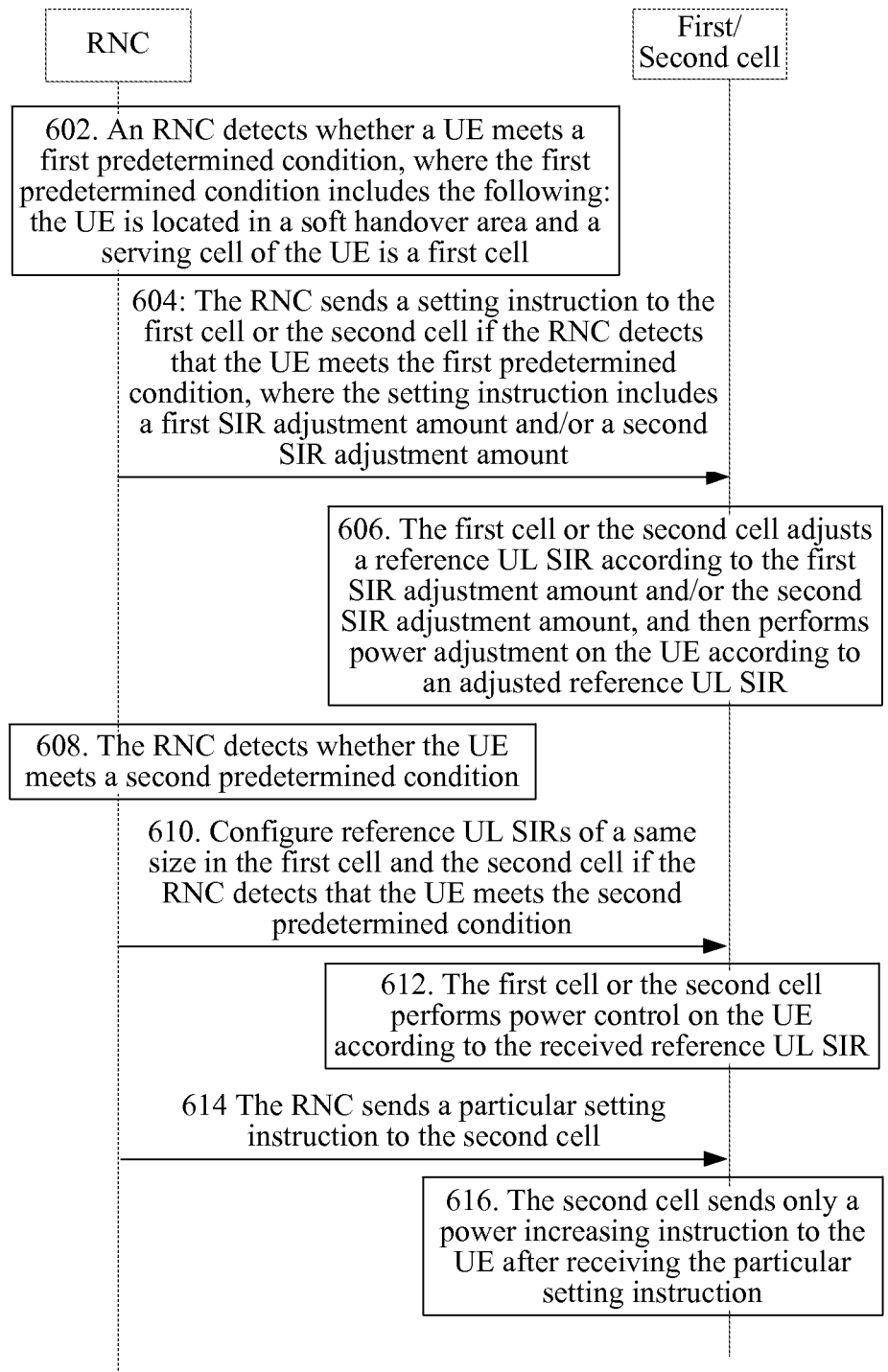
FIG. 6 is a method flowchart of a power control method according to still another embodiment of the present invention.

Referring to FIG. 6, FIG. 6 shows a method flowchart of a power control method according to still another embodiment of the present invention. The power control method is mainly used for power control when an active set of a UE includes both a first cell and a second cell. This embodiment is described mainly by using an example in which the first cell is a macro cell, and the second cell is a micro cell, and an RNC configures different reference UL SIR values in the first cell and the second cell by using newly added information element signaling. The power control method includes:

Step 602: An RNC detects whether the UE meets a first predetermined condition, where the first predetermined condition includes the following: the UE is located in a soft handover area and a serving cell of the UE is the first cell.

The RNC may configure different reference UL SIR values in the first cell and the second cell only when the UE meets the first predetermined condition. The first predetermined condition may include the following: the UE is located in the soft handover area and the serving cell of the UE is the first cell, which is similar to a scenario in which the UE is located in the CB area in FIG. 1. Certainly, the first predetermined condition may also further include another condition. For example, the first predetermined condition may be that the UE is located in the soft handover area, and the serving cell of the UE is the first cell, and a difference obtained by subtracting downlink transmit power of the second cell from downlink transmit power of the first cell is greater than a predetermined threshold. This embodiment is described by using only an example in which the predetermined condition includes the following: the UE is located in the soft handover area and the serving cell of the UE is the first cell.

The RNC may perform, according to internally pre-stored information and information reported by the UE in real time, a process of determining whether the UE meets the first predetermined condition.

Step 604: The RNC sends a setting instruction to the first cell or the second cell if the RNC detects that the UE meets the first predetermined condition, where the setting instruction includes a first SIR adjustment amount and/or a second SIR adjustment amount.

When the RNC detects that the UE meets the first predetermined condition, the RNC may configure different reference UL SIR values in the first cell and the second cell. Specifically, the RNC may send the setting instruction to the first cell, where the setting instruction includes the first SIR adjustment amount, so that a first reference UL SIR that is configured this time and obtained by the first cell is: a current first reference UL SIR+the first SIR adjustment amount, where the first SIR adjustment amount is a non-zero positive number or negative number. For example, the RNC sends a first SIR adjustment amount with a value of a negative number to the first cell, so that the first reference UL SIR is less than the second reference UL SIR. Or, the RNC may also send the setting instruction to the second cell, where the setting instruction includes the second SIR adjustment amount, so that a second reference UL SIR that is configured this time and obtained by the second cell is: a current second reference UL SIR+the second SIR adjustment amount, where the second SIR adjustment amount is a non-zero positive number or negative number. For example, the RNC sends a second SIR adjustment amount with a value of a positive number to the second cell, so that the second reference UL SIR is greater than the first reference UL SIR. Or, the RNC may also send setting instructions to both the first cell and the second cell, where the setting instruction sent to the first cell includes the first SIR adjustment amount, so that a first reference UL SIR that is configured this time and obtained by the first cell is: a current first reference UL SIR+/−the first SIR adjustment amount; the setting instruction sent to the second cell includes a second SIR adjustment amount, so that a second reference UL SIR that is configured this time and obtained by the second cell is: a current second reference UL SIR+/−the second SIR adjustment amount; and the first reference UL SIR configured this time is different from the second reference UL SIR configured this time.

It should be additionally noted that, before configuring different reference UL SIRs in the first cell and the second cell, the RNC may determine, according to a difference between an uplink path loss of the UE relative to the first cell and an uplink path loss of the UE relative to the second cell, a difference obtained when the first reference UL SIR is different from the second reference UL SIR. For example, the RNC may determine that an absolute value of the difference obtained when the first reference UL SIR is different from the second reference UL SIR is equal to an absolute value of the difference between the uplink path loss of the UE relative to the first cell and the uplink path loss of the UE relative to the second cell. Then, the RNC determines, according to the determined difference, a configuration parameter required when the reference UL SIRs/the reference UL SIR for the UE are/is configured in the first cell and/or the second cell, where the configuration parameter includes at least one of the first SIR adjustment amount and the second SIR adjustment amount. In another embodiment, the RNC may further determine the first UL SIR adjustment amount and/or the second SIR adjustment amount when both the path loss and the fading are considered.

The setting instruction may be newly added information element signaling.

Step 606: The first cell or the second cell adjusts a reference UL SIR according to the first SIR adjustment amount and/or the second SIR adjustment amount, and then performs power adjustment on the UE according to an adjusted reference UL SIR.

The first cell and/or the second cell receive/receives the first SIR adjustment amount and/or the second SIR adjustment amount that are/is sent by the RNC, and then adjusts the reference UL SIR according to the first SIR adjustment amount and/or the second SIR adjustment amount. Specifically, if the RNC sends the first SIR adjustment amount to the first cell, the first cell receives the setting instruction sent by the RNC, where the setting instruction includes the first SIR adjustment amount; and the first cell adjusts the first reference UL SIR to be: a current first reference UL SIR+the first SIR adjustment amount.

If the RNC sends the second SIR adjustment amount to the second cell, the second cell receives the setting instruction sent by the RNC, where the setting instruction includes the second SIR adjustment amount; and the second cell adjusts the second reference UL SIR to be: a current second reference UL SIR+the second SIR adjustment amount.

Hereafter, the first cell and the second cell perform power control on the UE according to an adjusted reference UL SIR. Specifically, when an actual UL SIR value of the UE is greater than the first reference UL SIR, the first cell sends a "power decreasing" instruction to the UE; when the actual UL SIR value of the UE is less than the first reference UL SIR, the first cell sends a "power increasing" instruction to the UE.

When the actual UL SIR value of the UE is greater than the second reference UL SIR, the second cell sends a "power decreasing" instruction to the UE; when the actual UL SIR value of the UE is less than the second reference UL SIR, the second cell sends a "power increasing" instruction to the UE.

Step 608: The RNC detects whether the UE meets a second predetermined condition.

It is easy to figure out that, the RNC may further reconfigure a same reference UL SIR value in the first cell and the second cell when the UE meets the second predetermined condition. The second predetermined condition includes the following: the UE leaves the soft handover area; or the serving cell of the UE is the second cell; or the UE currently does not use a service transmitted by downlink data; or the like. Therefore, after step 604, the RNC may further continue to detect whether the UE meets the second predetermined condition.

Step 610: Configure a same reference UL SIR value in the first cell and the second cell if the RNC detects that the UE meets the second predetermined condition.

The a same reference UL SIR value are configured in the first cell and the second cell if the RNC detects that the UE meets the second predetermined condition. This process may be easily figured out by associating step 604 and details are not described again.

Step 612: The first cell or the second cell performs power control on the UE according to the received reference UL SIR.

Hereafter, the first cell and the second cell may perform power control on the UE according to the same reference UL SIR value. Specific control details are the same as those in step 606, and details are not described again.

Step 614: The RNC sends a particular setting instruction to the second cell.

This embodiment may further combine the method described in Embodiment 1, that is, the RNC sends a setting instruction having a specified value to the second cell, so as to enable the second cell to send only a power increasing instruction to the UE.

The specified value is a predetermined number or a predetermined character.

Step 616: The second cell sends only a power increasing instruction to the UE after receiving the particular predetermined instruction.

In conclusion, according to the power control method provided in this embodiment of the present invention, different reference UL SIR values are configured in a first cell and a second cell, so that the second cell is triggered, only in the case of a higher threshold, to send a power increasing instruction to a UE, thereby resolving a problem that power control performed by the first cell on the UE cannot meet an actual requirement when the UE is located in a soft handover area and a serving cell is the first cell, and achieving an effect that power control performed by the first cell on the UE is enhanced so that uplink transmit power of the UE can meet a requirement of the first cell. In addition, by determining whether the UE meets a first predetermined condition and a second predetermined condition and then selectively configuring a same reference UL SIR value or different reference UL SIR values in the first cell and the second cell, the power control method provided in this embodiment can be better used in an existing communications system.

It should be noted that, the foregoing step 602, step 604, step 608, step 610, and step 614 may be implemented independently as a cell configuration method; the foregoing step 606, step 612, and step 616 may be implemented independently as a power control method.

The following are apparatus embodiments of the present invention. For content not described in detail, reference may be made to the foregoing corresponding method embodiments.

Figure 7:
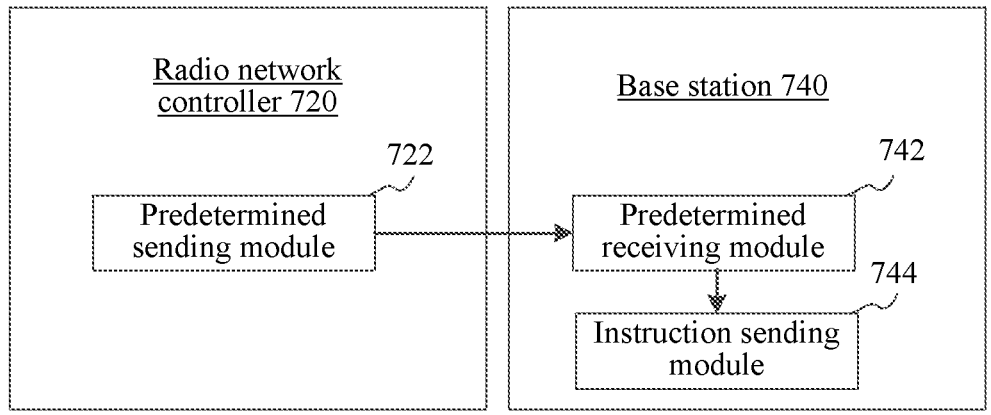
FIG. 7 is a structural block diagram of a communications system according to an embodiment of the present invention.

Referring to FIG. 7, FIG. 7 shows a structural block diagram of a communications system according to an embodiment of the present invention. The communications system may be used for power control when an active set of a UE includes both a first cell and a second cell. The communications system includes a radio network controller 720 and a base station 740 that is corresponding to the second cell.

The radio network controller 720 includes a predetermined sending module 722.

The predetermined sending module 722 is configured to send a predetermined instruction for the UE to the second cell, so that after receiving the predetermined instruction, the second cell sends only a power increasing instruction to the UE.

The base station 740 includes a predetermined receiving module 742 and an instruction sending module 744.

The predetermined receiving module 742 is configured to receive a predetermined instruction sent by the radio network controller for the UE.

The instruction sending module 744 is configured to send only a power increasing instruction to the UE after the predetermined receiving module 742 receives the predetermined instruction.

In conclusion, according to the communications system provided in this embodiment, an RNC sends a predetermined instruction to enable a second cell to send only a power increasing instruction to a UE, thereby resolving a problem that power control performed by a first cell on the UE cannot meet an actual requirement when the UE is located in a soft handover area and a serving cell is the first cell, and achieving an effect that power control performed by the first cell on the UE is enhanced so that uplink transmit power of the UE can meet a requirement of the first cell.

Figure 8:
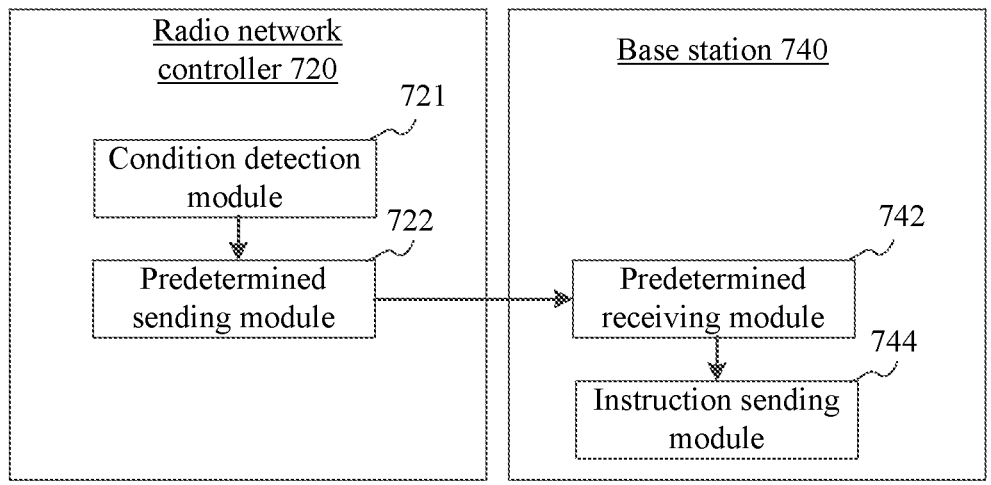
FIG. 8 is a structural block diagram of a communications system according to another embodiment of the present invention.

Referring to FIG. 8, FIG. 8 shows a structural block diagram of a communications system according to another embodiment of the present invention. The communications system may be used for power control when an active set of a UE includes both a first cell and a second cell. The communications system includes a radio network controller 720 and a base station 740 that is corresponding to the second cell.

The radio network controller 720 includes a condition detection module 721 and a predetermined sending module 722.

The condition detection module 721 is configured to detect whether the UE meets a first predetermined condition, where the first predetermined condition includes the following: the UE is located in a soft handover area and a serving cell of the UE is the first cell.

The predetermined sending module 722 is configured to send a predetermined instruction for the UE to the second cell if the condition detection module 721 detects that the UE meets the first predetermined condition, so that after receiving the predetermined instruction, the second cell sends only a power increasing instruction to the UE.

Further, the condition detection module 721 is further configured to detect whether the UE meets a second predetermined condition, where the second predetermined condition includes the following: the UE leaves the soft handover area or the serving cell of the UE is the second cell.

The predetermined sending module 722 is further configured to send a restoration instruction for the UE to the second cell if the condition detection module 721 detects that the UE meets the second predetermined condition, so that after receiving the restoration instruction, the second cell sends a power increasing instruction or a power decreasing instruction to the UE according to a normal mode.

Specifically, the predetermined instruction sent by the predetermined sending module 722 is uplink signal-to-interference ratio UL SIR signaling including a specified value, where the specified value is a value out of a value range of the UL SIR signaling, or the specified value is a specified value within a value range of the UL SIR signaling, or the specified value is a predetermined character; or the predetermined instruction sent by the predetermined sending module 722 is newly added information element signaling.

The restoration instruction sent by the predetermined sending module 722 is UL SIR signaling including a normal value; or the restoration instruction sent by the predetermined sending module 722 is newly added information element signaling.

The base station 740 includes a predetermined receiving module 742 and an instruction sending module 744.

The predetermined receiving module 742 is configured to receive a predetermined instruction sent by the radio network controller for the UE.

The instruction sending module 744 is configured to send only a power increasing instruction to the UE after the predetermined receiving module 742 receives the predetermined instruction.

Further, the predetermined receiving module 742 is further configured to receive a restoration instruction sent by the radio network controller for the UE.

The instruction sending module 744 is further configured to send a power increasing instruction or a power decreasing instruction to the UE according to a normal mode after the predetermined receiving module 742 receives the restoration instruction.

Specifically, the predetermined instruction received by the predetermined receiving module 742 is UL SIR signaling including a specified value or the predetermined instruction is newly added information element signaling; and when the predetermined instruction is the UL SIR signaling including a specified value, the specified value is a value out of a value range of the UL SIR signaling, or the specified value is a specified value within a value range of the UL SIR signaling, or the specified value is a predetermined character.

The restoration instruction received by the predetermined receiving module 742 is UL SIR signaling including a normal value; or the restoration instruction received by the predetermined receiving module 742 is newly added information element signaling.

In conclusion, according to the communications system provided in this embodiment, an RNC sends a predetermined instruction to enable a second cell to send only a power increasing instruction to a UE, thereby resolving a problem that power control performed by a first cell on the UE cannot meet an actual requirement when the UE is located in a soft handover area and a serving cell is the first cell, and achieving an effect that power control performed by the first cell on the UE is enhanced so that uplink transmit power of the UE can meet a requirement of the first cell. In addition, by determining whether the UE meets a first predetermined condition or a second predetermined condition and then selectively enabling the second cell to enter or exit a "special mode" of sending only a power increasing instruction to the UE, the power control method provided in this embodiment can be better used in an existing communications system.

Figure 9:
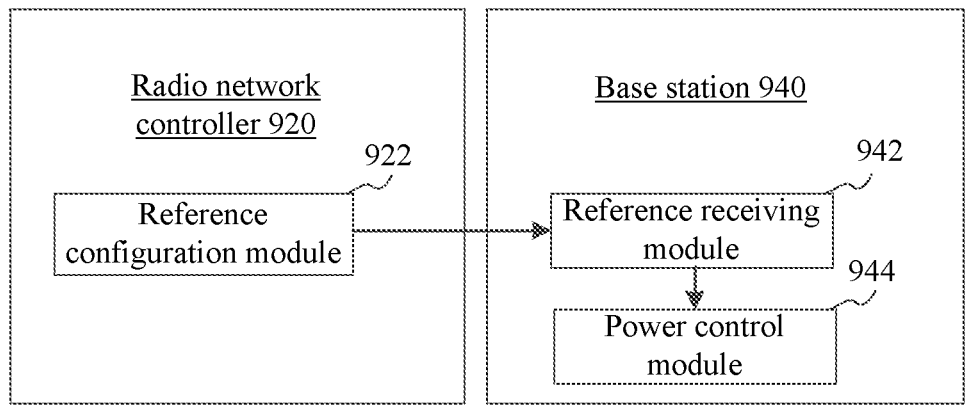
FIG. 9 is a structural block diagram of a communications system according to an embodiment of the present invention.

Referring to FIG. 9, FIG. 9 shows a structural block diagram of a communications system according to an embodiment of the present invention. The communications system may be used for power control when an active set of a UE includes both a first cell and a second cell. The communications system includes a radio network controller 920 and a base station 940 that is corresponding to the first cell or the second cell.

The radio network controller 920 includes a reference configuration module 922.

The reference configuration module 922 is configured to configure reference UL SIRs/a reference UL SIR for the UE in the first cell and/or the second cell, so that a first reference UL SIR for the UE in the first cell is different from a second reference UL SIR for the UE in the second cell.

The base station 940 includes a reference receiving module 942 and a power control module 944.

The reference receiving module 942 is configured to receive a reference UL SIR configured by the radio network controller for the UE, so that the first reference UL SIR for the UE in the first cell is different from the second reference UL SIR for the UE in the second cell.

The power control module 944 is configured to perform power control on the UE according to the reference UL SIR received by the reference receiving module 942.

In conclusion, according to the communications system provided in this embodiment, an RNC configures different reference UL SIR values in a first cell and a second cell, so that the second cell is triggered, only in the case of a higher threshold, to send a power increasing instruction to a UE, thereby resolving a problem that power control performed by the first cell on the UE cannot meet an actual requirement when the UE is located in a soft handover area and a serving cell is the first cell, and achieving an effect that power control performed by the first cell on the UE is enhanced so that uplink transmit power of the UE can meet a requirement of the first cell.

Figure 10:
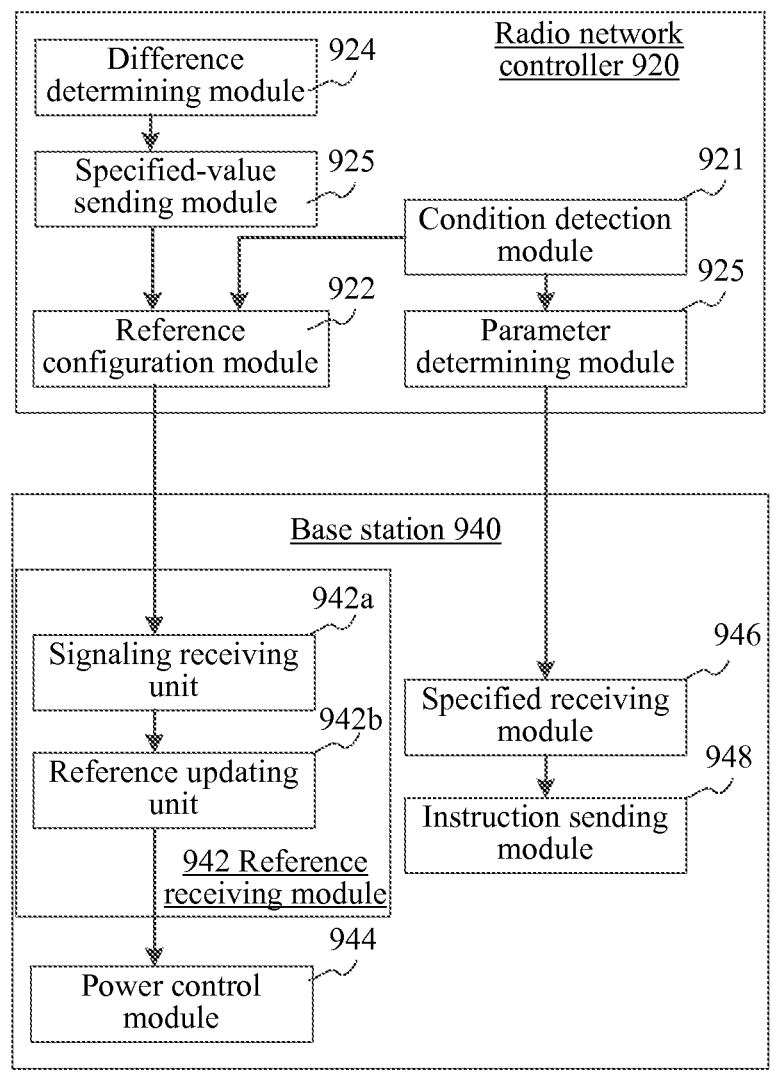
FIG. 10 is a structural block diagram of a communications system according to another embodiment of the present invention.

Referring to FIG. 10, FIG. 10 shows a structural block diagram of a communications system according to another embodiment of the present invention. The communications system may be used for power control when an active set of a UE includes both a first cell and a second cell. The communications system includes a radio network controller 920 and a base station 940 that is corresponding to the first cell or the second cell.

The radio network controller 920 includes a condition detection module 921 and a reference configuration module 922.

The condition detection module 921 is configured to detect whether the UE meets a first predetermined condition, where the first predetermined condition includes the following: the UE is located in a soft handover area and a serving cell of the UE is the first cell.

The reference configuration module 922 is configured to configure the reference UL SIRs/the reference UL SIR for the UE in the first cell and/or the second cell if the condition detection module 921 detects that the UE meets the first predetermined condition, so that a first reference UL SIR for the UE in the first cell is different from a second reference UL SIR for the UE in the second cell. Specifically, the reference configuration module 922 is specifically configured to send UL SIR signaling to the first cell, where the UL SIR signaling includes a first reference UL SIR configured this time, and the first reference UL SIR configured this time is different from a current second reference UL SIR; or the reference configuration module 922 is specifically configured to send UL SIR signaling to the second cell, where the UL SIR signaling includes a second reference UL SIR configured this time, and the second reference UL SIR configured this time is different from a current first reference UL SIR; or the reference configuration module 922 is specifically configured to send UL SIR signaling to both the first cell and the second cell, where the UL SIR signaling sent to the first cell includes a first reference UL SIR configured this time; the UL SIR signaling sent to the second cell includes a second reference UL SIR configured this time; and the first reference UL SIR configured this time is different from the second reference UL SIR configured this time.

Specifically, the UL SIR signaling sent by the reference configuration module 922 is UL SIR signaling whose value range has been extended.

Further, the radio network controller may further include a difference determining module 923 and a parameter determining module 924. The difference determining module 923 is configured to determine, according to a difference between an uplink path loss of the UE relative to the first cell and an uplink path loss of the UE relative to the second cell, a difference obtained when the first reference UL SIR is different from the second reference UL SIR.

The parameter determining module 924 is configured to determine, according to the difference determined by the difference determining module 923, a configuration parameter required when the reference configuration module 922 configures the reference UL SIRs/the reference UL SIR for the UE in the first cell and/or the second cell, where the configuration parameter includes at least one of the first reference UL SIR configured this time and the second reference UL SIR configured this time. In specific implementation, the difference determining module 923 is specifically configured to determine that an absolute value of the difference obtained when the first reference UL SIR is different from the second reference UL SIR is equal to an absolute value of the difference between the uplink path loss of the UE relative to the first cell and the uplink path loss of the UE relative to the second cell.

Further, the condition detection module 921 is further configured to detect whether the UE meets a second predetermined condition, where the second predetermined condition includes the following: the UE leaves the soft handover area or the serving cell of the UE is the second cell.

The reference configuration module 922 is further configured to configure the reference UL SIRs/the reference UL SIR for the UE in the first cell and/or the second cell if the condition detection module 921 detects that the UE meets the second predetermined condition, so that the first reference UL SIR for the UE in the first cell is equal to the second reference UL SIR for the UE in the second cell.

More preferably, the radio network controller 920 may further include a specified-value sending module 925, configured to send UL SIR signaling having a specified value to the second cell, so that after receiving the UL SIR signaling having a specified value, the second cell sends only a power increasing instruction to the UE.

The specified value is a value out of a value range of the UL SIR signaling, or the specified value is a specified value within a value range of the UL SIR signaling, or the specified value is a predetermined character.

The base station 940 includes a reference receiving module 942 and a power control module 944.

The reference receiving module 942 is configured to receive a reference UL SIR configured by the radio network controller 920 for the UE, so that the first reference UL SIR for the UE in the first cell is different from the second reference UL SIR for the UE in the second cell.

The power control module 944 is configured to perform power control on the UE according to the reference UL SIR received by the reference receiving module 942.

Specifically, the reference receiving module 942 specifically includes a signaling receiving unit 942a and a reference updating unit 942b.

The signaling receiving unit 942a is configured to receive UL SIR signaling sent by the radio network controller 920, where the UL SIR signaling includes a first reference UL SIR configured this time.

The reference updating unit 942b is configured to update a current first reference UL SIR with the first reference UL SIR that is configured this time and received by the signaling receiving unit 942a, where the first reference UL SIR configured this time is different from a current second reference UL SIR. Or, the signaling receiving unit 942a is configured to receive UL SIR signaling sent by the radio network controller 920, where the UL SIR signaling includes a second reference UL SIR configured this time.

The reference updating unit 942b is configured to update a current second reference UL SIR with the second reference UL SIR that is configured this time and received by the signaling receiving unit 942a, where the second reference UL SIR configured this time is different from a current first reference UL SIR.

The UL SIR signaling received by the signaling receiving unit 942a is UL SIR signaling whose value range has been extended.

More preferably, the base station 940 may further include a specified receiving module 946 and an instruction sending module 948.

The specified receiving module 946 is configured to receive UL SIR signaling that has a specified value and is sent by the radio network controller 920.

The instruction sending module 948 is configured to send only a power increasing instruction to the UE after the specified receiving module 946 receives the UL SIR signaling having a specified value.

The specified value is a value out of a value range of the UL SIR signaling, or the specified value is a specified value within a value range of the UL SIR signaling, or the specified value is a predetermined character.

In conclusion, according to the communications system provided in this embodiment of the present invention, different reference UL SIR values are configured in a first cell and a second cell, so that the second cell is triggered, only in the case of a higher threshold, to send a power increasing instruction to a UE, thereby resolving a problem that power control performed by the first cell on the UE cannot meet an actual requirement when the UE is located in a soft handover area and a serving cell is the first cell, and achieving an effect that power control performed by the first cell on the UE is enhanced so that uplink transmit power of the UE can meet a requirement of the first cell. In addition, by determining whether the UE meets a first predetermined condition and a second predetermined condition and then selectively configuring a same reference UL SIR value or different reference UL SIR values in the first cell and the second cell, the communications system provided in this embodiment can be better used in an existing communications system.

Figure 11:
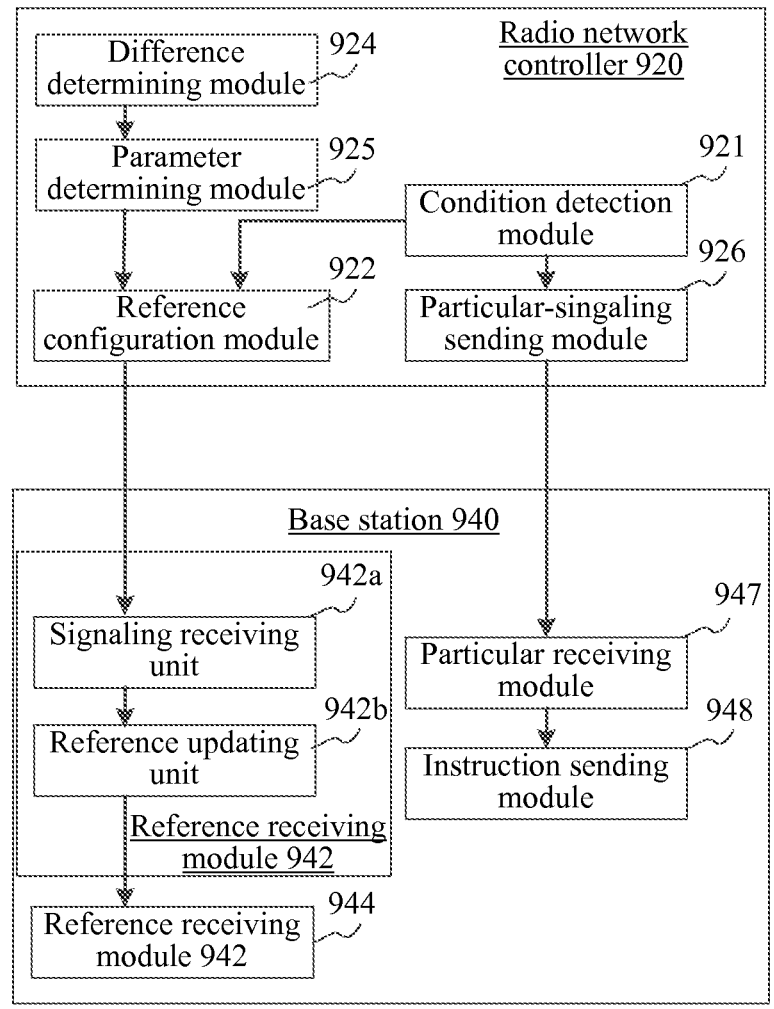
FIG. 11 is a structural block diagram of a communications system according to still another embodiment of the present invention.

Referring to FIG. 11, FIG. 11 shows a structural block diagram of a communications system according to still another embodiment of the present invention. The communications system may be used for power control when an active set of a UE includes both a first cell and a second cell. The communications system includes a radio network controller 920 and a base station 940 that is corresponding to the first cell or the second cell.

The radio network controller 920 includes a condition detection module 921 and a reference configuration module 922.

The condition detection module 921 is configured to detect whether the UE meets a first predetermined condition, where the first predetermined condition includes the following: the UE is located in a soft handover area and a serving cell of the UE is the first cell.

The reference configuration module 922 is configured to configure the reference UL SIRs/the reference UL SIR for the UE in the first cell and/or the second cell if the condition detection module 921 detects that the UE meets the first predetermined condition, so that a first reference UL SIR for the UE in the first cell is different from a second reference UL SIR for the UE in the second cell. Specifically, the reference configuration module 922 is specifically configured to send a setting instruction to the first cell, where the setting instruction includes a first SIR adjustment amount, so that a first reference UL SIR that is configured this time and obtained by the first cell is: a current first reference UL SIR+the first SIR adjustment amount; or the reference configuration module 922 is specifically configured to send a setting instruction to the second cell, where the setting instruction includes a second SIR adjustment amount, so that a second reference UL SIR that is configured this time and obtained by the second cell is: a current second reference UL SIR+the second SIR adjustment amount; or the reference configuration module 922 is specifically configured to send setting instructions to both the first cell and the second cell, where the setting instruction sent to the first cell includes a first SIR adjustment amount, so that a first reference UL SIR that is configured this time and obtained by the first cell is: a current first reference UL SIR+/−the first SIR adjustment amount; the setting instruction sent to the second cell includes a second SIR adjustment amount, so that a second reference UL SIR that is configured this time and obtained by the second cell is: a current second reference UL SIR+/−the second SIR adjustment amount; and the first reference UL SIR configured this time is different from the second reference UL SIR configured this time.

The setting instruction sent by the reference configuration module 922 is newly added information element signaling.

Further, the radio network controller may further include a difference determining module 923 and a parameter determining module 924. The difference determining module 923 is configured to determine, according to a difference between an uplink path loss of the UE relative to the first cell and an uplink path loss of the UE relative to the second cell, a difference obtained when the first reference UL SIR is different from the second reference UL SIR.

The parameter determining module 924 is configured to determine, according to the difference determined by the difference determining module 923, a configuration parameter required when the reference configuration module 922 configures the reference UL SIRs/the reference UL SIR for the UE in the first cell and/or the second cell, where the configuration parameter includes at least one of the first SIR adjustment amount and the second SIR adjustment amount that are configured this time. In specific implementation, the difference determining module 923 is specifically configured to determine that an absolute value of the difference obtained when the first reference UL SIR is different from the second reference UL SIR is equal to an absolute value of the difference between the uplink path loss of the UE relative to the first cell and the uplink path loss of the UE relative to the second cell.

Further, the condition detection module 921 is further configured to detect whether the UE meets a second predetermined condition, where the second predetermined condition includes the following: the UE leaves the soft handover area or the serving cell of the UE is the second cell.

The reference configuration module 922 is further configured to configure the reference UL SIRs/the reference UL SIR for the UE in the first cell and/or the second cell if the condition detection module 921 detects that the UE meets the second predetermined condition, so that the first reference UL SIR for the UE in the first cell is equal to the second reference UL SIR for the UE in the second cell.

More preferably, the radio network controller 920 may further include a particular-signaling sending module 926, configured to send particular setting signaling to the second cell, where the particular setting signaling includes a second SIR adjustment amount having a specified value, so that after receiving the second SIR adjustment amount having a specified value, the micro cell sends only a power increasing instruction to the UE, where the specified value is a predetermined number or a predetermined character.

The base station 940 includes a reference receiving module 942 and a power control module 944.

The reference receiving module 942 is configured to receive a reference UL SIR configured by the radio network controller for the UE, so that the first reference UL SIR for the UE in the first cell is different from the second reference UL SIR for the UE in the second cell.

The power control module 944 is configured to perform power control on the UE according to the reference UL SIR received by the reference receiving module 942.

Specifically, the reference receiving module 942 specifically includes a setting receiving unit 942c and a reference adjusting unit 942d.

The setting receiving unit 942c is configured to receive a setting instruction sent by the radio network controller 920, where the setting instruction includes a first SIR adjustment amount; and the reference adjusting unit 942d is configured to adjust the first reference UL SIR to be: a current first reference UL SIR+the first SIR adjustment amount; or the setting receiving unit 942c is configured to receive a setting instruction sent by the radio network controller 920, where the setting instruction includes a second SIR adjustment amount; and the reference adjusting unit 942d is configured to adjust the second reference UL SIR to be: a current second reference UL SIR+the second SIR adjustment amount.

The setting instruction received by the setting receiving unit 942c is newly added information element signaling.

More preferably, the base station 940 further includes a particular receiving module 947 and an instruction sending module 948.

The particular receiving module 947 is configured to receive a particular setting signaling sent by the radio network controller 920, where the particular setting signaling includes a second SIR adjustment amount having a specified value.

The instruction sending module 948 is configured to send only a power increasing instruction to the UE after the particular receiving module 947 receives the second SIR adjustment amount having a specified value, where the specified value is a predetermined number or a predetermined character.

In conclusion, according to the communications system provided in this embodiment of the present invention, different reference UL SIR values are configured in a first cell and a second cell, so that the second cell is triggered, only in the case of a higher threshold, to send a power increasing instruction to a UE, thereby resolving a problem that power control performed by the first cell on the UE cannot meet an actual requirement when the UE is located in a soft handover area and a serving cell is the first cell, and achieving an effect that power control performed by the first cell on the UE is enhanced so that uplink transmit power of the UE can meet a requirement of the first cell. In addition, by determining whether the UE meets a first predetermined condition and a second predetermined condition and then selectively configuring a same reference UL SIR value or different reference UL SIR values in the first cell and the second cell, the communications system provided in this embodiment can be better used in an existing communications system.

Figure 12:
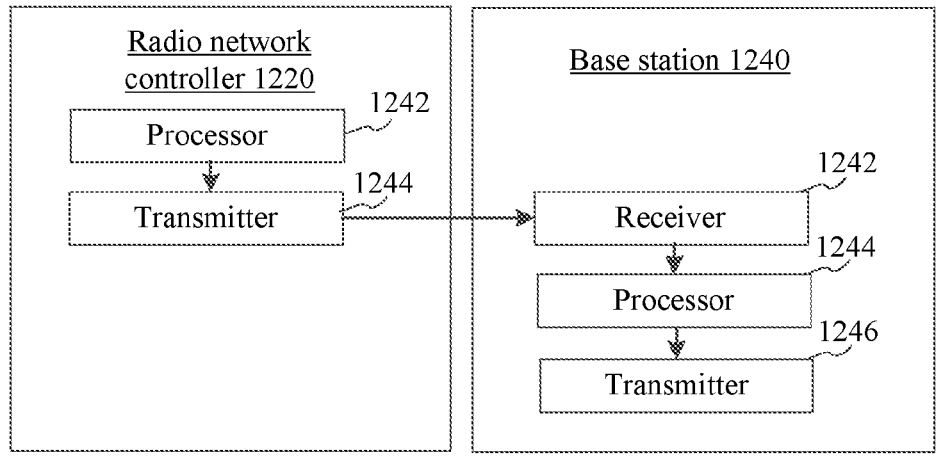
FIG. 12 is a structural block diagram of a communications system according to an embodiment of the present invention.

Referring to FIG. 12, FIG. 12 shows a structural block diagram of a communications system according to an embodiment of the present invention. The communications system may be used for power control when an active set of a UE includes both a first cell and a second cell. The communications system includes a radio network controller 1220 and a base station 1240 that is corresponding to the second cell.

The radio network controller 1220 includes a processor 1222 and a transmitter 1224.

The processor 1222 is configured to control the transmitter 1224 to send a predetermined instruction for the UE to the second cell, so that after receiving the predetermined instruction, the second cell sends only a power increasing instruction to the UE.

The base station 1240 includes a receiver 1242, a processor 1244 and a transmitter 1246.

The receiver 1242 is configured to receive a predetermined instruction sent by the radio network controller 1220 for the UE.

The processor 1244 is configured to control the transmitter 1246 to send only a power increasing instruction to the UE after the receiver 1242 receives the predetermined instruction.

In conclusion, according to the communications system provided in this embodiment, an RNC sends a predetermined instruction to enable a second cell to send only a power increasing instruction to a UE, thereby resolving a problem that power control performed by a first cell on the UE cannot meet an actual requirement when the UE is located in a soft handover area and a serving cell is the first cell, and achieving an effect that power control performed by the first cell on the UE is enhanced so that uplink transmit power of the UE can meet a requirement of the first cell.

In a more preferred embodiment of the previous embodiment, the processor 1222 and the transmitter 1224 in the radio network controller 1220 may further have the following functions:

The processor 1222 is further configured to detect whether the UE meets a first predetermined condition, where the first predetermined condition includes the following: the UE is located in a soft handover area and a serving cell of the UE is the first cell.

The transmitter 1224 is specifically configured to send the predetermined instruction for the UE to the second cell if the processor 1222 detects that the UE meets the first predetermined condition.

The processor 1222 is further configured to detect whether the UE meets a second predetermined condition, where the second predetermined condition includes the following: the UE leaves the soft handover area or the serving cell of the UE is the second cell.

The transmitter 1224 is further configured to send a restoration instruction for the UE to the second cell if the processor 1222 detects that the UE meets the second predetermined condition, so that after receiving the restoration instruction, the second cell sends a power increasing instruction or a power decreasing instruction to the UE according to a normal mode.

The predetermined instruction sent by the transmitter 1224 is uplink signal-to-interference ratio UL SIR signaling including a specified value or the predetermined instruction is newly added information element signaling; and when the predetermined instruction is the uplink signal-to-interference ratio UL SIR signaling including a specified value, the specified value is a value out of a value range of the UL SIR signaling, or the specified value is a specified value within a value range of the UL SIR signaling, or the specified value is a predetermined character.

The restoration instruction sent by the transmitter 1224 is UL SIR signaling including a normal value; or the restoration instruction sent by the transmitter 1224 is newly added information element signaling.

Accordingly, the receiver 1242, the processor 1244 and the transmitter 1246 in the base station 1240 further have the following functions:

The receiver 1242 is configured to receive a predetermined instruction sent by the radio network controller 1220 for the UE.

The processor 1244 is configured to control, after the receiver 1242 receives the predetermined instruction, the transmitter 1246 to send only a power increasing instruction to the UE.

The receiver 1242 is further configured to receive a restoration instruction sent by the radio network controller 1220 for the UE.

The processor 1244 is configured to control, after the receiver 1242 receives the restoration instruction, the transmitter to send a power increasing instruction or a power decreasing instruction to the UE according to a normal mode.

The predetermined instruction received by the receiver 1242 is UL SIR signaling including a specified value or the predetermined instruction is newly added information element signaling; and when the predetermined instruction is the UL SIR signaling including a specified value, the specified value is a value out of a value range of the UL SIR signaling, or the specified value is a specified value within a value range of the UL SIR signaling, or the specified value is a predetermined character.

The restoration instruction received by the receiver 1242 is UL SIR signaling including a normal value; or the restoration instruction received by the receiver 1242 is newly added information element signaling.

In conclusion, according to the communications system provided in this embodiment, an RNC sends a predetermined instruction to enable a second cell to send only a power increasing instruction to a UE, thereby resolving a problem that power control performed by a first cell on the UE cannot meet an actual requirement when the UE is located in a soft handover area and a serving cell is the first cell, and achieving an effect that power control performed by the first cell on the UE is enhanced so that uplink transmit power of the UE can meet a requirement of the first cell. In addition, by determining whether the UE meets a first predetermined condition or a second predetermined condition and then selectively enabling the second cell to enter or exit a "special mode" of sending only a power increasing instruction to the UE, the power control method provided in this embodiment can be better used in an existing communications system.

Figure 13:
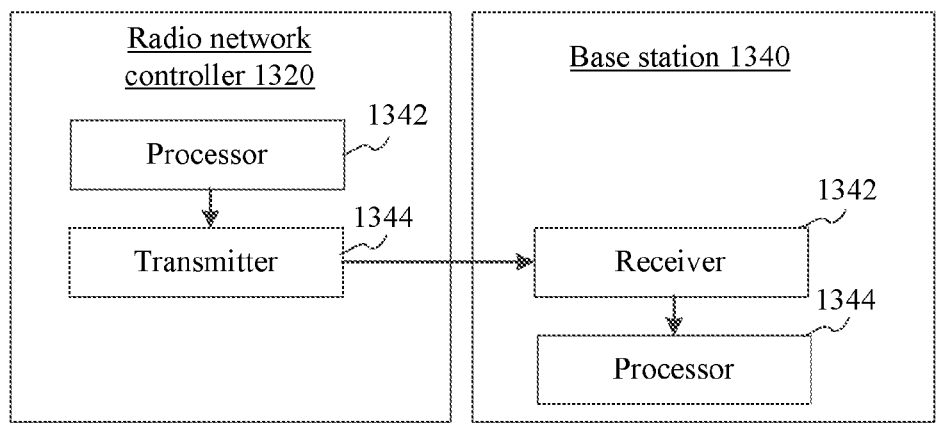
FIG. 13 is a schematic structural diagram of a communications system according to an embodiment of the present invention.

Referring to FIG. 13, FIG. 13 shows a structural block diagram of a communications system according to an embodiment of the present invention. The communications system may be used for power control when an active set of a UE includes both a first cell and a second cell. The communications system includes a radio network controller 1320 and a base station 1340 that is corresponding to the second cell.

The radio network controller 1320 includes a processor 1322 and a transmitter 1324.

The processor 1322 is configured to control the transmitter 1324 to configure the reference UL SIRs/the reference UL SIR for the UE in the first cell and/or the second cell, so that a first reference UL SIR for the UE in the first cell is different from a second reference UL SIR for the UE in the second cell.

The base station 1340 includes a receiver 1342 and a processor 1344.

The receiver 1342 is configured to receive a reference UL SIR configured by the radio network controller 1320 for the UE, so that a first reference UL SIR for the UE in the first cell is different from a second reference UL SIR for the UE in the second cell.

The processor 1344 is configured to perform power control on the UE according to the reference UL SIR received by the receiver 1342.

In conclusion, according to the communications system provided in this embodiment, an RNC configures different reference UL SIR values in a first cell and a second cell, so that the second cell is triggered, only in the case of a higher threshold, to send a power increasing instruction to a UE, thereby resolving a problem that power control performed by the first cell on the UE cannot meet an actual requirement when the UE is located in a soft handover area and a serving cell is the first cell, and achieving an effect that power control performed by the first cell on the UE is enhanced so that uplink transmit power of the UE can meet a requirement of the first cell.

Figure 14:
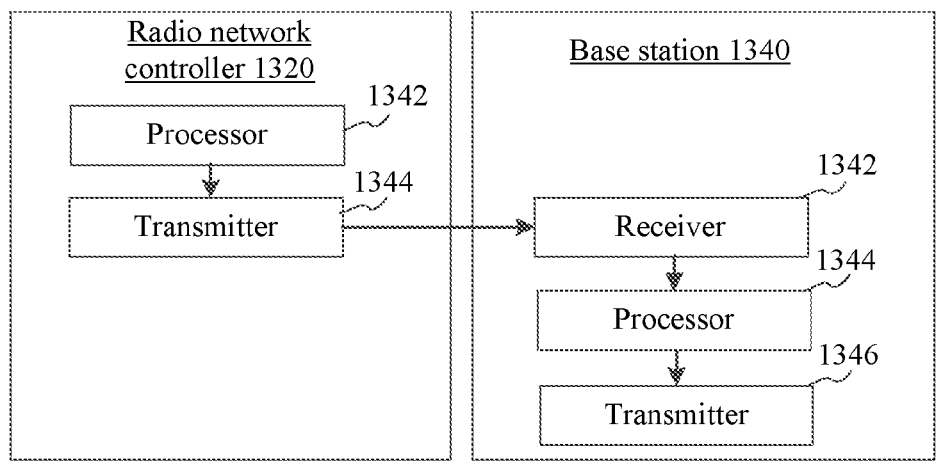
FIG. 14 is a structural block diagram of a communications system according to another embodiment of the present invention.

Referring to FIG. 14, FIG. 14 shows a structural block diagram of a communications system according to another embodiment of the present invention. The communications system may be used for power control when an active set of a UE includes both a first cell and a second cell. The communications system includes a radio network controller 1320 and a base station 1340 that is corresponding to the second cell.

The radio network controller 1320 includes a processor 1322 and a transmitter 1324.

The processor 1322 is further configured to detect whether the UE meets a first predetermined condition, where the first predetermined condition includes the following: the UE is located in a soft handover area and a serving cell of the UE is the first cell.

The transmitter 1324 is configured to configure the reference UL SIRs/the reference UL SIR for the UE in the first cell and/or the second cell if the processor 1322 detects that the UE meets the first predetermined condition. Specifically, the processor 1322 is specifically configured to control the transmitter 1324 to send UL SIR signaling to the first cell, where the UL SIR signaling includes a first reference UL SIR configured this time, and the first reference UL SIR configured this time is different from a current second reference UL SIR; or the processor 1322 is specifically configured to control the transmitter 1324 to send UL SIR signaling to the second cell, where the UL SIR signaling includes a second reference UL SIR configured this time, and the second reference UL SIR configured this time is different from a current first reference UL SIR; or the processor 1322 is specifically configured to control the transmitter 1324 to send UL SIR signaling to both the first cell and the second cell, where the UL SIR signaling sent to the first cell includes a first reference UL SIR configured this time; the UL SIR signaling sent to the second cell includes a second reference UL SIR configured this time; and the first reference UL SIR configured this time is different from the second reference UL SIR configured this time.

The UL SIR signaling sent by the transmitter 1324 is UL SIR signaling whose value range has been extended.

Further, the processor 1322 is further configured to determine, according to a difference between an uplink path loss of the UE relative to the first cell and an uplink path loss of the UE relative to the second cell, a difference obtained when the first reference UL SIR is different from the second reference UL SIR. For example, the processor 1322 is specifically configured to determine that an absolute value of the difference obtained when the first reference UL SIR is different from the second reference UL SIR is equal to an absolute value of the difference between the uplink path loss of the UE relative to the first cell and the uplink path loss of the UE relative to the second cell.

The processor 1322 is further configured to determine, according to the difference, a configuration parameter required when the reference UL SIRs/the reference UL SIR for the UE are/is configured in the first cell and/or the second cell, where the configuration parameter includes at least one of the first reference UL SIR configured this time and the second reference UL SIR configured this time.

Further, the processor 1322 is further configured to detect whether the UE meets a second predetermined condition, where the second predetermined condition includes the following: the UE leaves the soft handover area or the serving cell of the UE is the second cell.

The transmitter 1324 is further configured to configure the reference UL SIRs/the reference UL SIR for the UE in the first cell and/or the second cell if the processor 1322 detects that the UE meets the second predetermined condition, so that the first reference UL SIR for the UE in the first cell is equal to the second reference UL SIR for the UE in the second cell.

The processor 1322 is further configured to control the transmitter 1324 to send UL SIR signaling having a specified value to the second cell, so that after receiving the UL SIR signaling having a specified value, the second cell sends only a power increasing instruction to the UE, where the specified value is a value out of a value range of the UL SIR signaling, or the specified value is a specified value within a value range of the UL SIR signaling, or the specified value is a predetermined character.

The base station 1340 includes a receiver 1342, a processor 1344 and a transmitter 1346.

The receiver 1342 is configured to receive a reference UL SIR configured by the radio network controller 1320 for the UE, so that a first reference UL SIR for the UE in the first cell is different from a second reference UL SIR for the UE in the second cell.

The processor 1344 is configured to perform power control on the UE according to the reference UL SIR received by the receiver 1342.

The receiver 1342 is specifically configured to receive UL SIR signaling sent by the radio network controller, where the UL SIR signaling includes a first reference UL SIR configured this time; and the processor 1344 is specifically configured to update a current first reference UL SIR with the first reference UL SIR that is configured this time and received by the receiver 1342, where the first reference UL SIR configured this time is different from a current second reference UL SIR; or the receiver 1342 is specifically configured to receive UL SIR signaling sent by the radio network controller, where the UL SIR signaling includes a second reference UL SIR configured this time; and the processor 1344 is specifically configured to update a current second reference UL SIR with the second reference UL SIR that is configured this time and received by the receiver 1342, where the second reference UL SIR configured this time is different from a current first reference UL SIR.

The UL SIR signaling received by the receiver 1342 is UL SIR signaling whose value range has been extended.

More preferably, the base station 1340 further includes a transmitter 1346.

The receiver 1342 is configured to receive UL SIR signaling that has a specified value and is sent by the radio network controller.

The processor 1344 is configured to control, after the receiver 1342 receives the UL SIR signaling having a specified value, the transmitter 1346 to send only a power increasing instruction to the UE, where the specified value is a value out of a value range of the UL SIR signaling, or the specified value is a specified value within a value range of the UL SIR signaling, or the specified value is a predetermined character.

In conclusion, according to the communications system provided in this embodiment of the present invention, different reference UL SIR values are configured in a first cell and a second cell, so that the second cell is triggered, only in the case of a higher threshold, to send a power increasing instruction to a UE, thereby resolving a problem that power control performed by the first cell on the UE cannot meet an actual requirement when the UE is located in a soft handover area and a serving cell is the first cell, and achieving an effect that power control performed by the first cell on the UE is enhanced so that uplink transmit power of the UE can meet a requirement of the first cell. In addition, by determining whether the UE meets a first predetermined condition and a second predetermined condition and then selectively configuring a same reference UL SIR value or different reference UL SIR values in the first cell and the second cell, the communications system provided in this embodiment can be better used in an existing communications system.

Further referring to FIG. 14, FIG. 14 further shows a structural block diagram of a communications system according to still another embodiment of the present invention. The communications system may be used for power control when an active set of a UE includes both a first cell and a second cell. The communications system includes a radio network controller 1320 and a base station 1340 that is corresponding to the second cell.

The radio network controller 1320 includes a processor 1322 and a transmitter 1324.

The processor 1322 is further configured to detect whether the UE meets a first predetermined condition, where the first predetermined condition includes the following: the UE is located in a soft handover area and a serving cell of the UE is the first cell.

The transmitter 1324 is configured to configure the reference UL SIRs/the reference UL SIR for the UE in the first cell and/or the second cell if the processor 1322 detects that the UE meets the first predetermined condition. Specifically, the processor 1322 is specifically configured to control the transmitter 1324 to send a setting instruction to the first cell, where the setting instruction includes a first SIR adjustment amount, so that a first reference UL SIR that is configured this time and obtained by the first cell is: a current first reference UL SIR+the first SIR adjustment amount; or the processor 1322 is specifically configured to control the transmitter 1324 to send a setting instruction to the second cell, where the setting instruction includes a second SIR adjustment amount, so that a second reference UL SIR that is configured this time and obtained by the second cell is: a current second reference UL SIR+the second SIR adjustment amount; or the processor 1322 is specifically configured to control the transmitter 1324 to send setting instructions to both the first cell and the second cell, where the setting instruction sent to the first cell includes a first SIR adjustment amount, so that a first reference UL SIR that is configured this time and obtained by the first cell is: a current first reference UL SIR+/−the first SIR adjustment amount; the setting instruction sent to the second cell includes a second SIR adjustment amount, so that a second reference UL SIR that is configured this time and obtained by the second cell is: a current second reference UL SIR+/−the second SIR adjustment amount; and the first reference UL SIR configured this time is different from the second reference UL SIR configured this time.

The setting instruction sent by the transmitter 1324 is newly added information element signaling.

Further, the processor 1322 is further configured to determine, according to a difference between an uplink path loss of the UE relative to the first cell and an uplink path loss of the UE relative to the second cell, a difference obtained when the first reference UL SIR is different from the second reference UL SIR. For example, the processor 1322 is specifically configured to determine that an absolute value of the difference obtained when the first reference UL SIR is different from the second reference UL SIR is equal to an absolute value of the difference between the uplink path loss of the UE relative to the first cell and the uplink path loss of the UE relative to the second cell.

The processor 1322 is further configured to determine, according to the difference, a configuration parameter required when the reference UL SIRs/the reference UL SIR for the UE are/is configured in the first cell and/or the second cell, where the configuration parameter includes at least one of the first SIR adjustment amount and the second SIR adjustment amount.

Further, the processor 1322 is further configured to detect whether the UE meets a second predetermined condition, where the second predetermined condition includes the following: the UE leaves the soft handover area or the serving cell of the UE is the second cell.

The transmitter 1324 is further configured to configure the reference UL SIRs/the reference UL SIR for the UE in the first cell and/or the second cell if the processor 1322 detects that the UE meets the second predetermined condition, so that the first reference UL SIR for the UE in the first cell is equal to the second reference UL SIR for the UE in the second cell.

The processor 1322 is further configured to control the transmitter 1324 to send particular setting signaling to the second cell, where the particular setting signaling includes a second SIR adjustment amount having a specified value, so that after receiving the second SIR adjustment amount having a specified value, the micro cell sends only a power increasing instruction to the UE, where the specified value is a predetermined number or a predetermined character.

The base station 1340 includes a receiver 1342, a processor 1344 and a transmitter 1346.

The receiver 1342 is configured to receive a reference UL SIR configured by the radio network controller 1320 for the UE, so that a first reference UL SIR for the UE in the first cell is different from a second reference UL SIR for the UE in the second cell.

The processor 1344 is configured to perform power control on the UE according to the reference UL SIR received by the receiver 1342.

The processor 1344 is further configured to control the transmitter 1346 to send setting signaling to the second cell, where the setting signaling includes a second SIR adjustment amount having a specified value, so that after receiving the second SIR adjustment amount having a specified value, the micro cell sends only a power increasing instruction to the UE, where the specified value is a predetermined number or a predetermined character.

The receiver 1342 is configured to receive a setting instruction sent by the radio network controller 1320, where the setting instruction includes a first SIR adjustment amount; and the processor 1344 is specifically configured to adjust the first reference UL SIR to be: a current first reference UL SIR+the first SIR adjustment amount received by the receiver 1342; or the receiver 1342 is specifically configured to receive a setting instruction sent by the radio network controller 1320, where the setting instruction includes a second SIR adjustment amount; and the processor 1344 is specifically configured to adjust the second reference UL SIR to be: a current second reference UL SIR+the second SIR adjustment amount received by the receiver 1342.

The setting instruction received by the receiver 1342 is newly added information element signaling.

More preferably, the base station 1340 further includes a transmitter 1346.

The receiver 1342 is configured to receive particular setting signaling sent by the radio network controller, where the particular setting signaling includes a second SIR adjustment amount having a specified value.

The processor 1344 is configured to control, after the receiver 1342 receives the second SIR adjustment amount having a specified value, the transmitter 1346 to send only a power increasing instruction to the UE, where the specified value is a predetermined number or a predetermined character.

In conclusion, according to the communications system provided in this embodiment of the present invention, different reference UL SIR values are configured in a first cell and a second cell, so that the second cell is triggered, only in the case of a higher threshold, to send a power increasing instruction to a UE, thereby resolving a problem that power control performed by the first cell on the UE cannot meet an actual requirement when the UE is located in a soft handover area and a serving cell is the first cell, and achieving an effect that power control performed by the first cell on the UE is enhanced so that uplink transmit power of the UE can meet a requirement of the first cell. In addition, by determining whether the UE meets a first predetermined condition and a second predetermined condition and then selectively configuring a same reference UL SIR value or different reference UL SIR values in the first cell and the second cell, the communications system provided in this embodiment can be better used in an existing communications system.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the principle of the present invention shall fall within the protection scope of the present invention.

What is claimed is:

1. A cell configuration method, used for power control when an active set of a user equipment (UE) comprises both a first cell and a second cell, wherein the method comprises:

determining, according to a difference between an uplink path loss of the UE relative to the first cell and an uplink path loss of the UE relative to the second cell, a difference obtained when a first reference uplink signal-to-interference ratio (UL SIR) is different from a second reference UL SIR; and determining, according to the difference, a configuration parameter required when the reference UL SIRs/a reference UL SIR for the UE are/is configured in the first cell and/or the second cell, wherein the configuration parameter comprises at least one of the following: the first reference UL SIR currently configured, the second reference UL SIR currently configured, a first SIR adjustment amount, and a second SIR adjustment amount; and configuring the reference uplink signal-to-interference ratios (UL SIRs)/the reference uplink signal-to-interference ratio (UL SIR) for the UE in the first cell and/or the second cell, so that the first reference UL SIR for the UE in the first cell is different from the second reference UL SIR for the UE in the second cell.

2. The cell configuration method according to claim 1, wherein the configuring reference UL SIRs/a reference UL SIR for the UE in the first cell and/or the second cell, so that a first reference UL SIR for the UE in the first cell is different from a second reference UL SIR for the UE in the second cell comprises:

sending UL SIR signaling to the first cell, wherein the UL SIR signaling comprises the first reference UL SIR currently configured, and the first reference UL SIR currently configured is different from a current second reference UL SIR; or sending UL SIR signaling to the second cell, wherein the UL SIR signaling comprises the second reference UL SIR currently configured, and the second reference UL SIR currently configured is different from a current first reference UL SIR; or sending UL SIR signaling to both the first cell and the second cell, wherein the UL SIR signaling sent to the first cell comprises a first reference UL SIR currently configured; the UL SIR signaling sent to the second cell comprises a second reference UL SIR currently configured; and the first reference UL SIR currently configured is different from the second reference UL SIR currently configured.

3. The cell configuration method according to claim 2, wherein the UL SIR signaling is UL SIR signaling whose value range has been extended.

4. The cell configuration method according to claim 1, wherein the configuring reference UL SIRs/a reference UL SIR for the UE in the first cell and/or the second cell, so that a first reference UL SIR for the UE in the first cell is different from a second reference UL SIR for the UE in the second cell comprises:
  sending a setting instruction to the first cell, wherein the setting instruction comprises the first SIR adjustment amount, so that the first reference UL SIR that is currently configured and obtained by the first cell is: a current first reference UL SIR+the first SIR adjustment amount; or
  sending a setting instruction to the second cell, wherein the setting instruction comprises the second SIR adjustment amount, so that the second reference UL SIR that is currently configured and obtained by the second cell is: a current second reference UL SIR+the second SIR adjustment amount; or
  sending setting instructions to both the first cell and the second cell, wherein the setting instruction sent to the first cell comprises a first SIR adjustment amount, so that a first reference UL SIR that is currently configured and obtained by the first cell is: a current first reference UL SIR+/−the first SIR adjustment amount; the setting instruction sent to the second cell comprises a second SIR adjustment amount, so that a second reference UL SIR that is currently configured and obtained by the second cell is: a current second reference UL SIR+/−the second SIR adjustment amount; and the first reference UL SIR currently configured is different from the second reference UL SIR currently configured.

5. The cell configuration method according to claim 4, wherein the setting instruction is newly added information element signaling.

6. The cell configuration method according to claim 1, wherein the determining, according to a difference between an uplink path loss of the UE relative to the first cell and an uplink path loss of the UE relative to the second cell, a difference obtained when the first reference UL SIR is different from the second reference UL SIR comprises:
  determining that an absolute value of the difference obtained when the first reference UL SIR is different from the second reference UL SIR is equal to an absolute value of the difference between the uplink path loss of the UE relative to the first cell and the uplink path loss of the UE relative to the second cell.

7. The cell configuration method according to claim 1, before the configuring reference UL SIRs/a reference UL SIR for the UE in the first cell and/or the second cell, further comprising:
  detecting whether the UE meets a first predetermined condition, wherein the first predetermined condition comprises the following: the UE is located in a soft handover area and a serving cell of the UE is the first cell; and
  configuring the reference UL SIRs/the reference UL SIR for the UE in the first cell and/or the second cell if it is detected that the UE meets the first predetermined condition.

8. The cell configuration method according to claim 7, after the configuring reference UL SIRs/a reference UL SIR for the UE in the first cell and/or the second cell, further comprising:
  detecting whether the UE meets a second predetermined condition, wherein the second predetermined condition comprises the following: the UE leaves the soft handover area or the serving cell of the UE is the second cell; and
  configuring the reference UL SIRs/the reference UL SIR for the UE in the first cell and/or the second cell if it is detected that the UE meets the second predetermined condition, so that the first reference UL SIR for the UE in the first cell is equal to the second reference UL SIR for the UE in the second cell.

9. The cell configuration method according to claim 1, wherein the method further comprises:
  sending UL SIR signaling having a specified value to the second cell, so that after receiving the UL SIR signaling having a specified value, the second cell sends only a power increasing instruction to the UE.

10. The cell configuration method according to claim 4, wherein the method further comprises:
  sending particular setting signaling to the second cell, wherein the particular setting signaling comprises a second SIR adjustment amount having a specified value, so that after receiving the second SIR adjustment amount having a specified value, the micro cell sends only a power increasing instruction to the UE.

11. A radio network controller, used for power control when an active set of a user equipment (UE) comprises both a first cell and a second cell, comprising:
  a processor; and
  a transmitter, wherein
  the processor is configured to control the transmitter to send a predetermined instruction for the UE to the second cell, so that after receiving the predetermined instruction, the second cell sends only a power increasing instruction to the UE, and to detect whether the UE meets a first predetermined condition, wherein the first predetermined condition comprises the following: the UE is located in a soft handover area and a serving cell of the UE is the first cell; and
  the transmitter is configured to send the predetermined instruction for the UE to the second cell if the processor detects that the UE meets the first predetermined condition, wherein:
  the processor is further configured to detect whether the UE meets a second predetermined condition, wherein the second predetermined condition comprises the following: the UE leaves the soft handover area or the serving cell of the UE is the second cell; and
  the transmitter is further configured to send a restoration instruction for the UE to the second cell if the processor detects that the UE meets the second predetermined condition, so that after receiving the restoration instruction, the second cell sends a power increasing instruction or a power decreasing instruction to the UE according to a normal mode.

12. The radio network controller according to claim 11, wherein:
  the restoration instruction sent by the transmitter is UL SIR signaling comprising a normal value.

13. The radio network controller according to claim 11, wherein:
  the restoration instruction sent by the transmitter is newly added information element signaling.

14. The radio network controller according to claim 11, wherein:
  the predetermined instruction sent by the transmitter is uplink signal-to-interference ratio (UL SIR) signaling comprising a specified value or newly added information element signaling; and when the predetermined instruction is the uplink signal-to-interference ratio UL SIR signaling comprising a specified value, the specified value is a value out of a value range of the UL SIR signaling, or the specified value is a specified value within a value range of the UL SIR signaling, or the specified value is a predetermined character.

15. The radio network controller according to claim 11, wherein: the transmitter is specially configured to transmit UL SIR signaling to the first cell, wherein the UL SIR signaling comprises a first reference UL SIR currently configured, and the first reference UL SIR currently configured is different from a current second reference UL SIR; or transmit UL SIR signaling to the second cell, wherein the UL SIR signaling comprises a second reference UL SIR currently configured, and the second reference UL SIR currently configured is different from a current first reference UL SIR; or transmit UL SIR signaling to both the first cell and the second cell, wherein the UL SIR signaling sent to the first cell comprises a first reference UL SIR currently configured; the UL SIR signaling sent to the second cell comprises a second reference UL SIR currently configured; and the first reference UL SIR currently configured is different from the second reference UL SIR currently configured.

16. The radio network controller according to claim 11, wherein: the transmitter is specially configured to transmit a setting instruction to the first cell, wherein the setting instruction comprises a first SIR adjustment amount, so that a first reference UL SIR that is currently configured and obtained by the first cell is: a current first reference UL SIR+the first SIR adjustment amount; or transmit a setting instruction to the second cell, wherein the setting instruction comprises a second SIR adjustment amount, so that a second reference UL SIR that is currently configured and obtained by the second cell is: a current second reference UL SIR+the second SIR adjustment amount; or transmit setting instructions to both the first cell and the second cell, wherein the setting instruction sent to the first cell comprises a first SIR adjustment amount, so that a first reference UL SIR that is currently configured and obtained by the first cell is: a current first reference UL SIR+/−the first SIR adjustment amount; the setting instruction sent to the second cell comprises a second SIR adjustment amount, so that a second reference UL SIR that is currently configured and obtained by the second cell is: a current second reference UL SIR+/−the second SIR adjustment amount; and the first reference UL SIR currently configured is different from the second reference UL SIR currently configured.

17. A communications system, used for power control when an active set of a user equipment (UE) comprises both a first cell and a second cell, comprising a radio network controller and a base station, wherein:

the radio network controller comprises:

a processor; and a transmitter, the processor is configured to control the transmitter to send a predetermined instruction for the UE to the second cell, so that after receiving the predetermined instruction, the second cell sends only a power increasing instruction to the UE, and to detect whether the UE meets a first predetermined condition, wherein the first predetermined condition comprises the following: the UE is located in a soft handover area and a serving cell of the UE is the first cell; and the transmitter is configured to send the predetermined instruction for the UE to the second cell if the processor detects that the UE meets the first predetermined condition, wherein:

the processor is further configured to detect whether the UE meets a second predetermined condition, wherein the second predetermined condition comprises the following: the UE leaves the soft handover area or the serving cell of the UE is the second cell; and the transmitter is further configured to send a restoration instruction for the UE to the second cell if the processor detects that the UE meets the second predetermined condition, so that after receiving the restoration instruction, the second cell sends a power increasing instruction or a power decreasing instruction to the UE according to a normal mode; and the base station corresponds to the second cell, and includes a receiver, a transmitter, and a processor, the receiver is configured to receive the predetermined instruction sent by the radio network controller; and the processor is configured to control the transmitter to send only a power increasing instruction to the UE after the receiver receives the predetermined instruction.

\* \* \* \* \*